US012496823B2

(12) United States Patent
Takahama

(10) Patent No.: US 12,496,823 B2
(45) Date of Patent: Dec. 16, 2025

(54) LIQUID JET HEAD, LIQUID JET RECORDING DEVICE, AND METHOD OF MANUFACTURING LIQUID JET HEAD

(71) Applicant: SII Printek Inc., Chiba (JP)

(72) Inventor: Yuichi Takahama, Chiba (JP)

(73) Assignee: SII PRINTEK INC., Chiba (JP)

( * ) Notice: Subject to any disclaimer, the term of this patent is extended or adjusted under 35 U.S.C. 154(b) by 175 days.

(21) Appl. No.: 18/471,956

(22) Filed: Sep. 21, 2023

(65) Prior Publication Data

US 2024/0100828 A1 Mar. 28, 2024

(30) Foreign Application Priority Data

Sep. 27, 2022 (JP) ................................ 2022-153662

(51) Int. Cl.
*B41J 2/14* (2006.01)
*B41J 2/16* (2006.01)
*B41J 29/377* (2006.01)

(52) U.S. Cl.
CPC ......... *B41J 2/1408* (2013.01); *B41J 2/14201* (2013.01); *B41J 2/14314* (2013.01); *B41J 2/1601* (2013.01); *B41J 2/1607* (2013.01); *B41J 2/1623* (2013.01); *B41J 29/377* (2013.01)

(58) Field of Classification Search
CPC .. B41J 29/377; B41J 2202/08; B41J 2202/12; B41J 2/1408
See application file for complete search history.

(56) References Cited

U.S. PATENT DOCUMENTS

2009/0051724 A1* 2/2009 Katoh ...................... B41J 2/145 347/18
2019/0126649 A1 5/2019 Midorikawa et al.

FOREIGN PATENT DOCUMENTS

JP 2019-084704 A 6/2019

* cited by examiner

*Primary Examiner* — Thinh H Nguyen
(74) *Attorney, Agent, or Firm* — Crowell & Moring LLP

(57) ABSTRACT

An occurrence of leakage is prevented. An inkjet head jets ink. The inkjet head is provided with a head main body, a cooling pipe, a jet-side coupling member, and a cooling-side coupling member, wherein the head main body has a jet flow path through which the ink passes, the cooling pipe has a cooling flow path through which the ink passes as a cooling medium for cooling a drive circuit, the jet-side coupling member is coupled to the head main body, a jet-side branch path branches from an ink flow path into which the ink inflows from an outside of the inkjet head, or from which the ink outflows, the jet-side branch path is communicated with the jet flow path, the jet-side branch path is provided to the jet-side coupling member, and the cooling-side coupling member is coupled to the jet-side coupling member, and is provided with a cooling-side branch path which branches from the ink flow path, and which is communicated with the cooling flow path. The cooling-side coupling member has a coupling surface along one surface of the jet-side coupling member, and along a direction perpendicular to the cooling pipe.

7 Claims, 12 Drawing Sheets

LIQUID JET HEAD, LIQUID JET RECORDING DEVICE, AND METHOD OF MANUFACTURING LIQUID JET HEAD

RELATED APPLICATIONS

This application claims priority to Japanese Patent application No. JP2022-153662, filed on Sep. 27, 2022, the entire content of which is incorporated herein by reference.

BACKGROUND OF THE INVENTION

1. Field of the Invention

The present disclosure relates to a liquid jet head, a liquid jet recording device, and a method of manufacturing a liquid jet head.

2. Description of the Related Art

In JP2019-84704A (Document 1), there is disclosed a liquid jet head provided with a liquid jet head chip for jetting a liquid, a cooling section including a cooling medium flow path through which a cooling medium passes, and a coupling unit. The coupling unit can detachably be attached to a main body part having the liquid jet head chip and the cooling section. The cooling section has a cooling pipe forming the cooling medium flow path, and a cooling plate having contact with an outer surface of the cooling pipe.

In Document 1, there is a mode in which ink is used not only as a raw material for printing but also as a cooling medium for cooling the control circuit and so on.

Incidentally, in an opening of an ejecting flow path and an opening (an opening end portion of the cooling pipe) of a cooling flow path, there exists a dimensional error in part manufacturing. When coupling the opening of the ejecting flow path and the opening of the cooling flow path with a single component (a single coupling component), an excessive load is applied to the coupling member in some cases due to the respective dimensional errors. When the excessive load is applied to the coupling member, the coupling member deforms, and there is a possibility of incurring an occurrence of a leakage such as an ink leakage.

The present disclosure is made in view of the problem described above, and has an object of preventing the occurrence of the leakage.

SUMMARY OF THE INVENTION (1) A liquid jet head according to an aspect of the present disclosure is a liquid jet head configured to jet liquid, and including a jet unit having a jet flow path through which the liquid passes, a cooling pipe having a cooling flow path through which the liquid passes as a cooling medium configured to cool a heat source, a jet-side coupling member coupled to the jet unit, and provided with a jet-side branch path which branches from a liquid flow path, and which is communicated with the jet flow path, the liquid inflowing in the liquid flow path from an outside of the liquid jet head or outflowing from the liquid flow path to the outside of the liquid jet head, and a cooling-side coupling member coupled to the jet-side coupling member, and provided with a cooling-side branch path which branches from the liquid flow path, and which is communicated with the cooling flow path, wherein the cooling-side coupling member has a coupling surface along one of surfaces of the jet-side coupling member, and along a direction crossing the cooling pipe.

According to the liquid jet head related to the present aspect, due to the dual-partitioning coupling structure provided with the jet-side coupling member and the cooling-side coupling member, it is possible for the coupling members to divide the load caused by dimensional errors of the openings of the jet flow path and the openings of the cooling flow path. In addition, by the coupling surface of the cooling-side coupling member extending along one surface of the jet-side coupling member, and at the same time, extending along the direction crossing the cooling pipe, it is possible to absorb a component along the coupling surface in the respective dimensional errors when coupling the cooling-side coupling member to the jet-side coupling member. Therefore, there is no chance to impose an excessive load to the coupling members, and it is possible to prevent the deformation of the coupling members. Therefore, it is possible to prevent the leakage from occurring.

(2) In the liquid jet head according to the aspect (1), the cooling-side coupling member can have a housing recess configured to house an end portion of the cooling pipe, and a gap can be disposed between a bottom surface of the housing recess and the end portion of the cooling pipe.

According to this configuration, when housing the end portion of the cooling pipe in the housing recess, it is possible to absorb the misalignment of the end portion of the cooling pipe (a component along an axial direction of the cooling pipe out of the dimensional errors) with the gap.

(3) In the liquid jet head according to the aspect (2), there can further be included an elastic member formed to have a ring-like shape along an outer circumference of the cooling pipe, wherein the housing recess can be formed to have a cylindrical shape extending along the end portion side of the cooling pipe, and can increase in diameter toward a direction of getting away from the bottom surface of the housing recess in an axial direction of the housing recess, and an outer diameter of the elastic member which does not elastically deform can be smaller than a maximum diameter of the housing recess, and larger than a minimum diameter of the housing recess.

According to this configuration, when housing the end portion side of the cooling pipe in the housing recess via the elastic member, the elastic member is elastically deformed so as to gradually be squeezed as the elastic member enters the housing recess toward the bottom surface. In the state in which the elastic member enters the housing recess toward the bottom surface, the elastic member is squeezed, and thus, the cooling pipe is elastically supported. Therefore, it is possible to absorb the respective dimensional errors with the elastic member. In addition, since the housing recess increases in diameter toward the direction of getting away from the bottom surface in the axial direction, the elastic member is gradually aligned (positioned inward in the radial direction) as the elastic member enters the housing recess toward the bottom surface. Therefore, due to the shape (a taper shape) increased in diameter of the housing recess, it is possible to achieve the positioning in the radial direction of the cooling pipe.

(4) In the liquid jet head according to any one of the aspects (1) to (3), there can further be included a cooling member which is higher in thermal conductivity than the cooling pipe, and in which at least a part of the cooling pipe is insert-molded.

For example, when at least a part of the cooling pipe is insert-molded in the cooling member, it becomes difficult to perform the positioning of the opening end part of the cooling pipe. In such a configuration, when coupling the respective openings with the single coupling member, there increases the possibility that an excessive load is imposed to the coupling member due to the respective dimensional errors. Then, the possibility of incurring occurrence of the leakage also increases.

In contrast, according to the present configuration, even when at least a part of the cooling pipe is insert-molded in the cooling member, the respective dimensional errors can be absorbed when coupling the cooling-side coupling member to the jet-side coupling member as described above, and therefore, there is no chance that an excessive load is imposed to the respective coupling members. Therefore, there is obtained a great advantage in preventing the leakage from occurring.

(5) In the liquid jet head according to the aspect (4), there can further be included a spacer formed to have a cylindrical shape along an outer circumference of the cooling pipe, wherein at least a part of the spacer can be disposed between the cooling member and the cooling-side coupling member.

According to this configuration, since the certain gap is created between the cooling member and the cooling-side coupling member due to the spacer, it is possible to absorb the dimensional errors of the cooling member and the cooling-side coupling member.

(6) In the liquid jet head according to any one of the aspects (1) to (5), the cooling-side coupling member can be fixed to a fastening target member to which the cooling-side coupling member is fastened with a bolt via a seating part provided with a through-hole for the bolt, and an inner diameter of the through-hole can be larger than a maximum diameter of an external thread part of the bolt.

According to this configuration, it becomes possible to move the seating part provided with the through-hole in a direction crossing the axial direction of the external thread part with respect to the external thread part of the bolt. Therefore, when fixing the cooling-side coupling member to the fastening target member with the bolt, it is possible to absorb the component crossing the axial direction of the external thread part out of the respective dimensional errors.

(7) A liquid jet recording device according to an aspect of the present disclosure includes the liquid jet head according to any one of the aspects (1) to (6), and a carriage to which the liquid jet head is attached.

According to the liquid jet recording device related to the present aspect, it is possible to obtain the liquid jet recording device capable of preventing the leakage from occurring.

(8) A method of manufacturing a liquid jet head according to an aspect of the present disclosure is a method of manufacturing a liquid jet head configured to jet liquid, and including a jet unit having a jet flow path through which the liquid passes, a cooling pipe having a cooling flow path through which the liquid passes as a cooling medium configured to cool a heat source, a jet-side coupling member coupled to the jet unit, and provided with a jet-side branch path which branches from a liquid flow path, and which is communicated with the jet flow path, the liquid inflowing in the liquid flow path from an outside of the liquid jet head or outflowing from the liquid flow path, and a cooling-side coupling member coupled to the jet-side coupling member, and provided with a cooling-side branch path which branches from the liquid flow path, and which is communicated with the cooling flow path, wherein the cooling-side coupling member has a coupling surface along one of surfaces of the jet-side coupling member, and along a direction crossing the cooling pipe, the method including coupling the cooling-side coupling member to the jet-side coupling member in a state in which the jet-side coupling member is coupled to the jet unit.

According to the method of manufacturing the liquid jet head related to the present aspect, due to the dual-partitioning coupling structure provided with the jet-side coupling member and the cooling-side coupling member, it is possible for the coupling members to divide the load caused by dimensional errors of the openings of the jet flow path and the openings of the cooling flow path. In addition, by the coupling surface of the cooling-side coupling member extending along one surface of the jet-side coupling member, and at the same time, extending along the direction crossing the cooling pipe, it is possible to absorb a component along the coupling surface in the respective dimensional errors in the step of coupling the cooling-side coupling member. Therefore, there is no chance to impose an excessive load to the coupling members, and it is possible to prevent the deformation of the coupling members. Therefore, it is possible to prevent the leakage from occurring.

DETAILED DESCRIPTION OF THE PREFERRED EMBODIMENTS

An embodiment according to the present disclosure will hereinafter be described with reference to the drawings.

In the embodiment and modified examples described hereinafter, constituents corresponding to each other are denoted by the same reference symbols, and the description thereof will be omitted in some cases. Further, in the following description, expressions representing relative or absolute arrangement such as “parallel,” “perpendicular,” “center,” and “coaxial” not only represent strictly such arrangements, but also represent the state of being relatively displaced with a tolerance, or an angle or a distance to the extent that the same function can be obtained.

[Printer 1]

Figure 1:
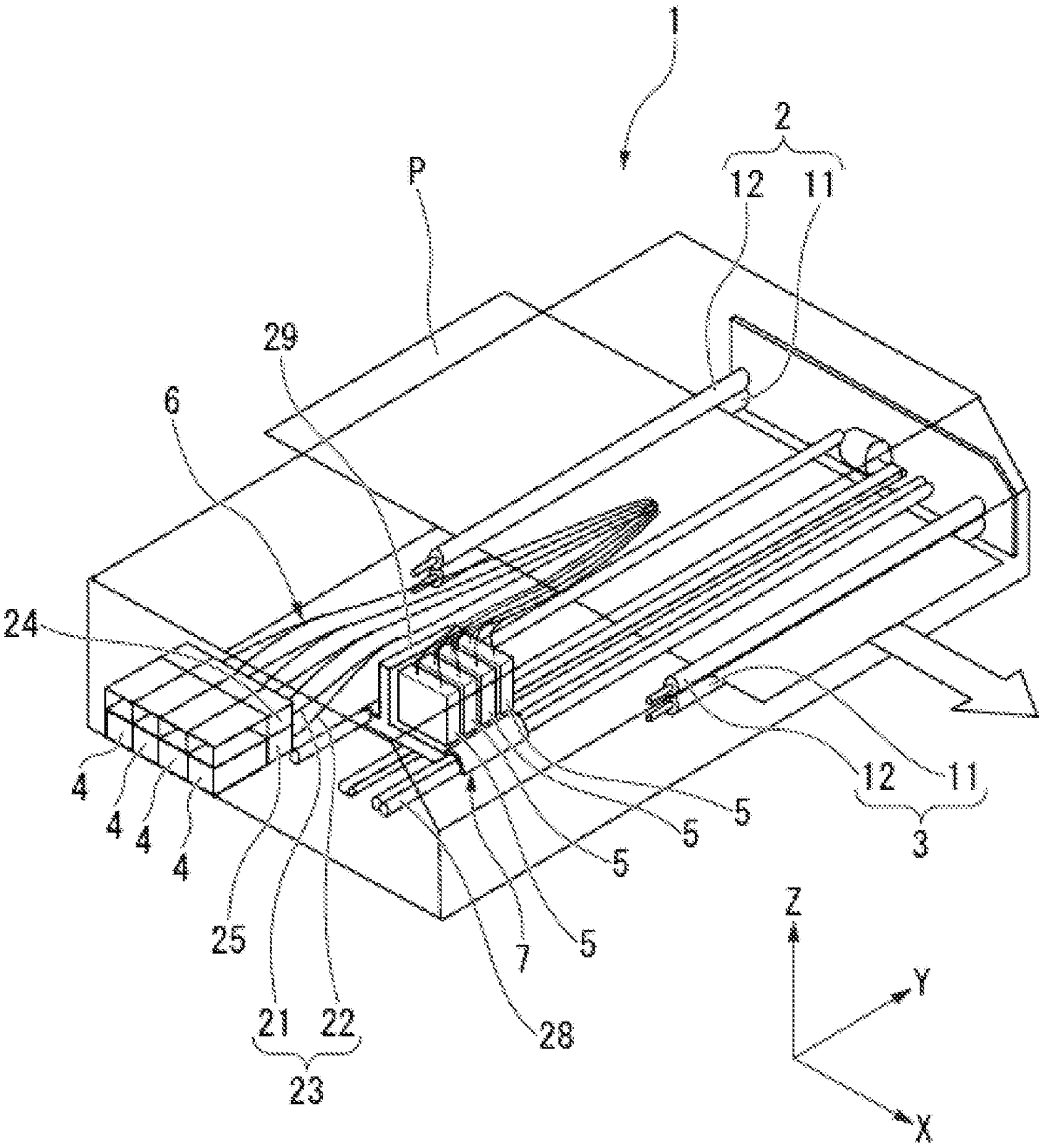
FIG. 1 is a schematic configuration diagram of a printer according to an embodiment.

FIG. 1 is a schematic configuration diagram of a printer 1 according to the embodiment.

As shown in FIG. 1, the printer 1 (a liquid jet recording device) according to the present embodiment is provided with a pair of conveying mechanisms 2, 3, ink tanks 4, inkjet heads 5 (liquid jet heads), ink circulation mechanisms 6, and a scanning mechanism 7.

In the following explanation, the description is presented using an orthogonal coordinate system of X, Y, and Z as needed. An X direction is a conveying direction (a sub-scanning direction) of a recording target medium P (e.g., paper). A Y direction is a scanning direction (a main-scanning direction) of the scanning mechanism 7. A Z direction is a height direction (a gravitational direction) perpendicular to the X direction and the Y direction.

Further, in the following explanation, the description will be presented defining an arrow side as a positive (+) side, and an opposite side to the arrow as a negative (−) side in the drawings in each of the X direction, the Y direction, and the Z direction. In the present embodiment, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction. There are disposed a plurality of ink tanks 4 which respectively contain ink of four colors such as yellow, magenta, cyan, and black.

There are disposed a plurality of inkjet heads 5 which are configured so as to be able to respectively eject the four colors of ink, namely the yellow ink, the magenta ink, the cyan ink, and the black ink in accordance with the ink tanks 4 coupled thereto.

Figure 2:
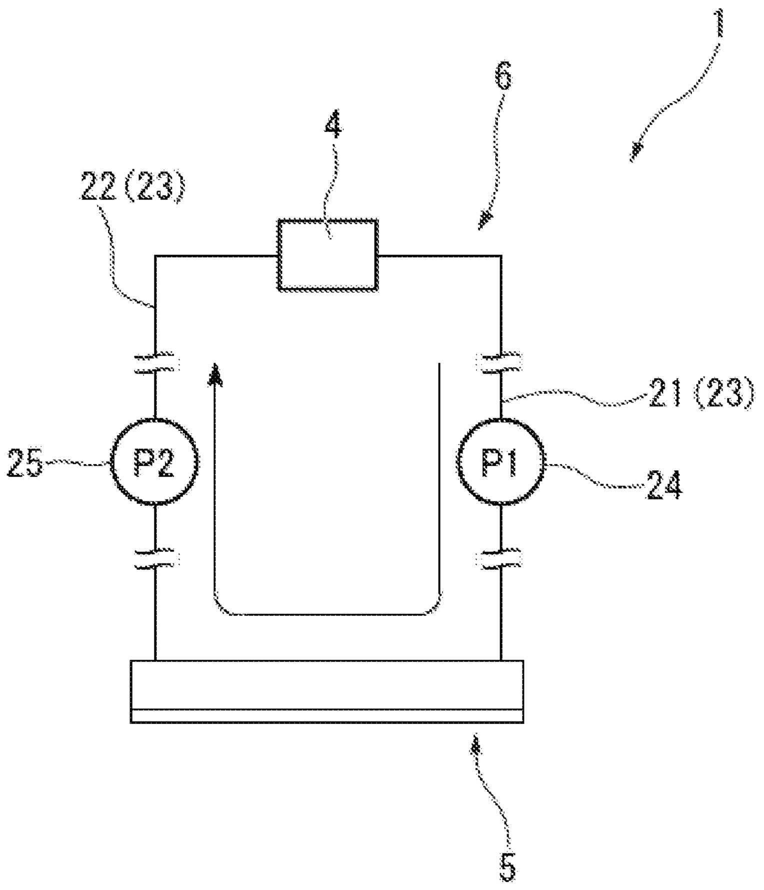
FIG. 2 is a schematic configuration diagram of an inkjet head and an ink circulation mechanism according to the embodiment.

FIG. 2 is a schematic configuration diagram of the inkjet head 5 and the ink circulation mechanism 6 related to the embodiment.

As shown in FIG. 1 and FIG. 2, the ink circulation mechanism 6 circulates the ink between the ink tank 4 and the inkjet head 5. Specifically, the ink circulation mechanism 6 is provided with a circulation flow path 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the inkjet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the inkjet head 5. The ink circulates between the inkjet head 5 and the ink tank 4 through the circulation flow path 23 due to drive of the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, a carriage 29 movably supported by the guide rail 28, and a drive device for moving the carriage 29. The drive device is constituted by, for example, a motor, a pulley, and a belt.

<Inkjet Heads 5>

The inkjet heads 5 are mounted on the carriage 29. The inkjet heads 5 according to the present embodiment are each an inkjet head of an electromechanical transduction system in which ink is ejected from a head chip including an actuator plate formed of a piezoelectric element made of PZT (lead zirconate titanate) or the like.

In this inkjet head 5, in order to eject the ink, a voltage is applied between electrodes on drive walls of an ejection path provided to the actuator plate to cause the drive wall to make a thickness-shear deformation. Thus, due to a change in volume of the ejection path, the ink in the ejection path is ejected through a nozzle hole. It should be noted that an ejection system of the liquid is not limited to the electromechanical transduction system described above, and it is possible to adopt a charge control system, a pressure vibration system, an electrothermal transduction system, an electrostatic suction system, and so on.

The charge control system is for providing a charge to a material with a charge electrode to eject the material from a nozzle while controlling a flight direction of the material with a deflection electrode.

Further, the pressure vibration system is for applying super high pressure to a material to eject the material toward a nozzle tip, and when a control voltage is not applied, the material goes straight to be ejected from the nozzle, and when the control voltage is applied, an electrostatic repelling force is generated between the materials, and the material flies in all directions to be prevented from being ejected from the nozzle.

Further, the electrothermal transduction system is for rapidly vaporizing a material with a heater provided in a space retaining the material to generate a bubble, to eject the material located in the space with the pressure of the bubble. The electrostatic suction system is for applying minute pressure to a space retaining a material to form a meniscus of the material in the nozzle, applying an electrostatic attractive force in this state, and then pulling the material out. Further, besides the above, it is possible to adopt technologies such as a system using a viscosity alteration of a fluid due to an electric field, or a system of flying a material with a discharge spark.

Figure 3:
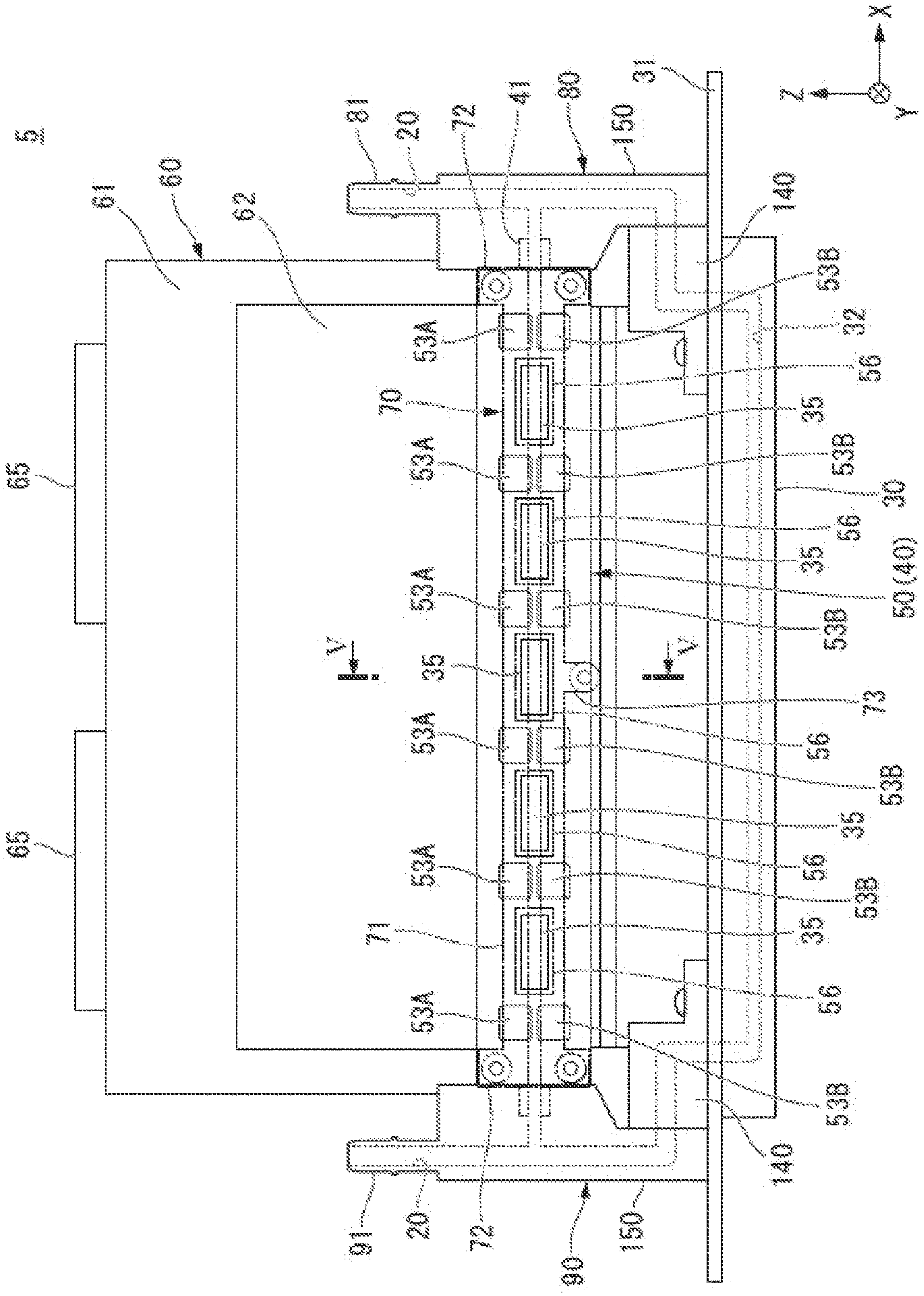
FIG. 3 is a front view of the inkjet head according to the embodiment.
Figure 4:
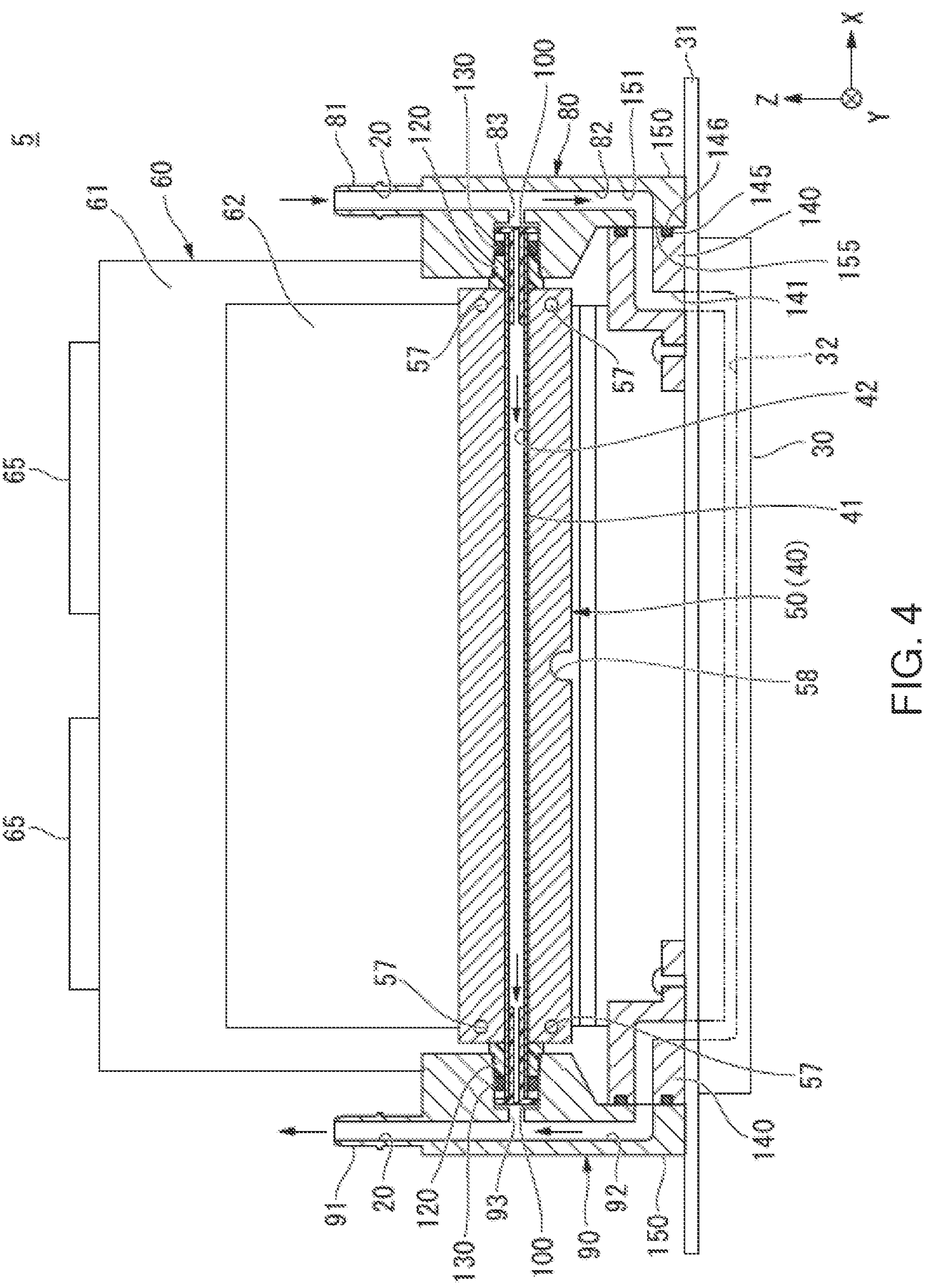
FIG. 4 is a cross-sectional view for explaining a flow of ink related to the embodiment.
Figure 5:
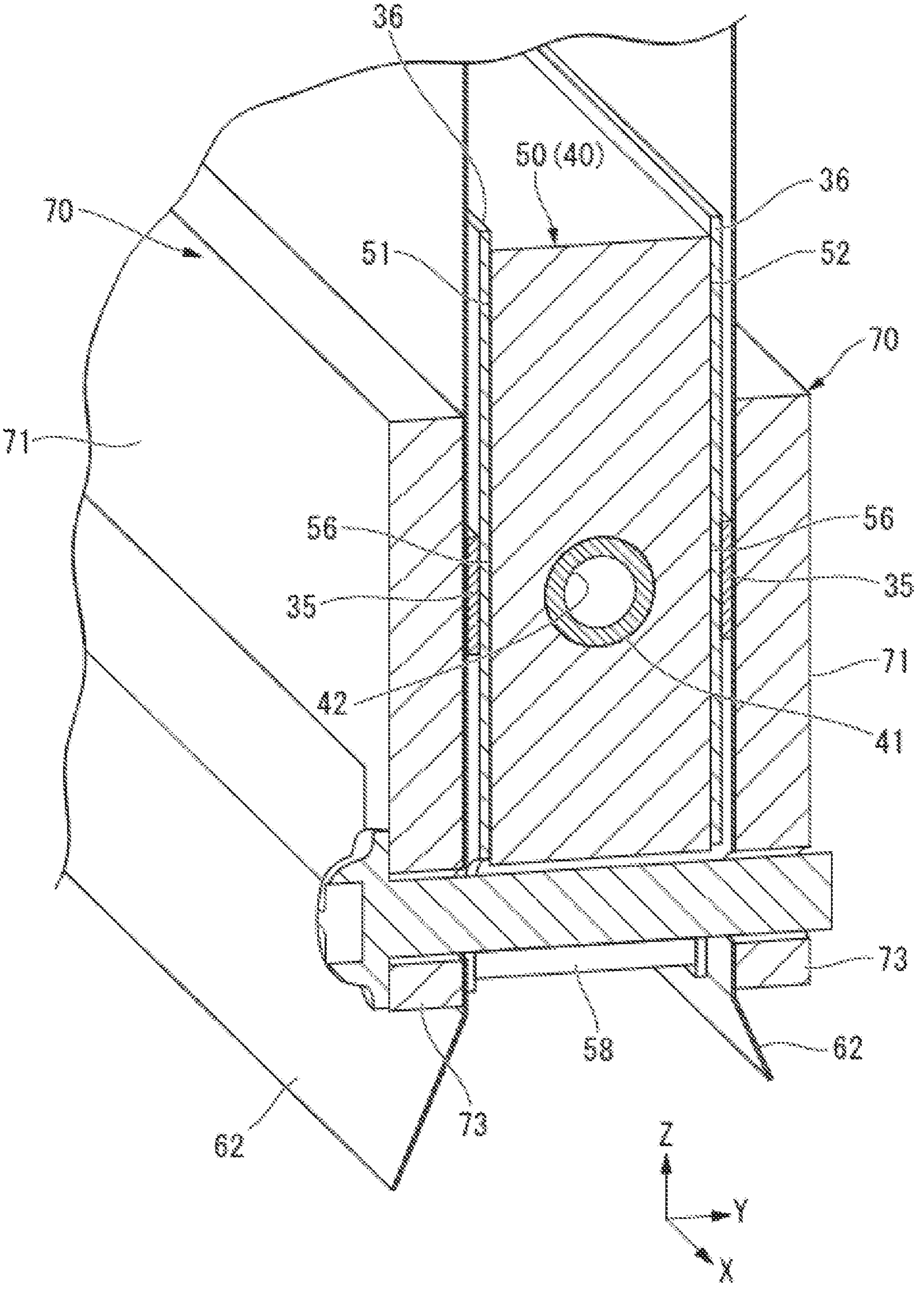
FIG. 5 is a cross-sectional view along an arrow V-V shown in FIG. 3.
Figure 6:
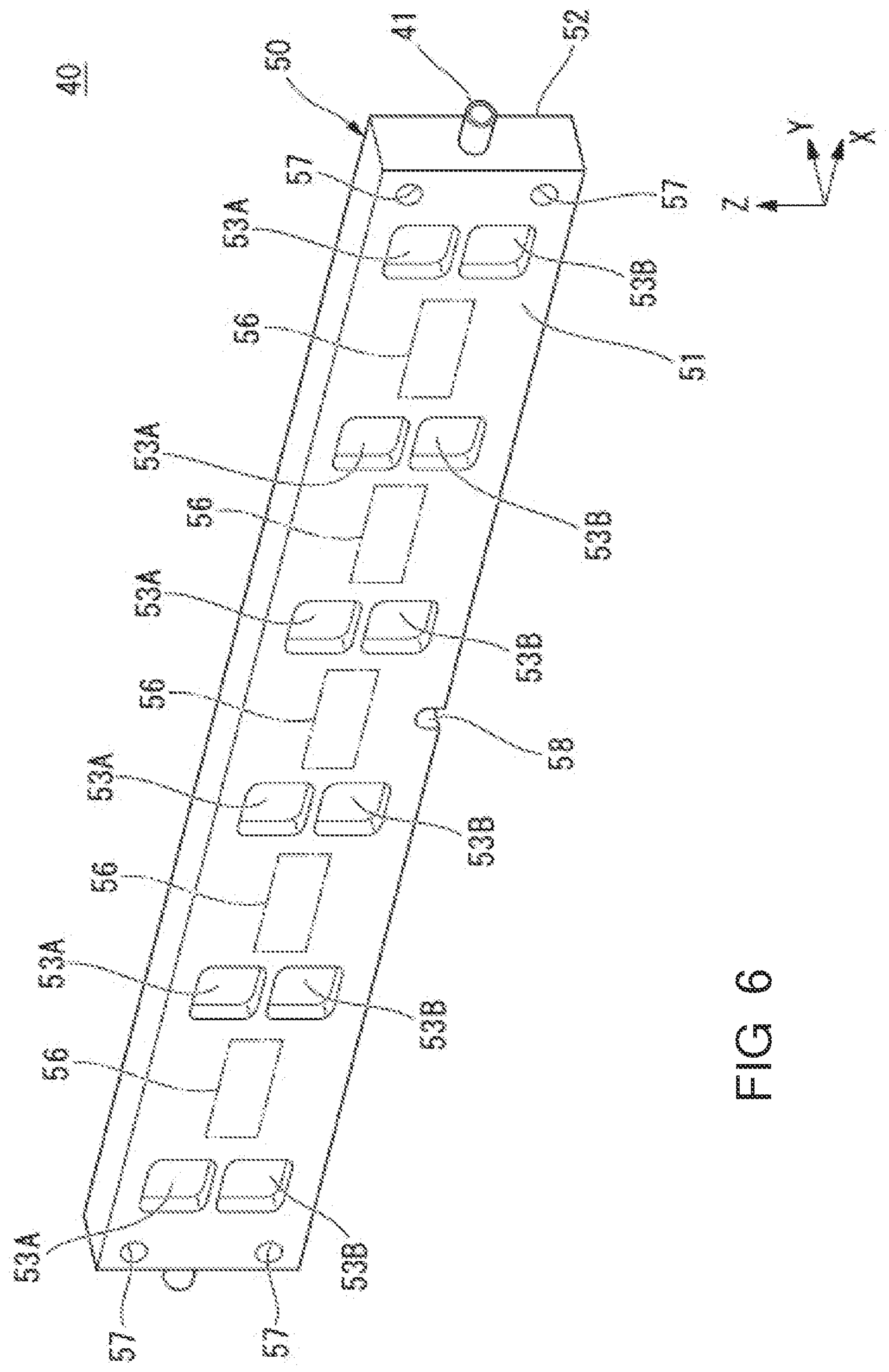
FIG. 6 is a perspective view of a cooling unit related to the embodiment.

FIG. 3 is a front view of the inkjet head 5 according to the embodiment. FIG. 4 is a cross-sectional view for explaining a flow of the ink related to the embodiment. FIG. 5 is a perspective cross-sectional view along an arrow V-V shown in FIG. 3. FIG. 6 is a perspective view of a cooling unit 40 related to the embodiment.

As shown in these drawings, the inkjet heads 5 each jet the ink (liquid). The inkjet heads 5 are each provided with a head main body 30 (a jet unit), a cooling pipe 41, a cooling member 50, throttle members 100, jet-side coupling members 140, and cooling-side coupling members 150, wherein the head main body 30 has a jet flow path 32 through which the ink passes, the cooling pipe 41 has a cooling flow path 42 through which the ink (a cooling medium) for cooling drive circuits 35 (heat sources) passes, at least a part of the cooling pipe 41 is embedded in the cooling member 50, the throttle members 100 each control a flow path resistance of the cooling flow path 42, the jet-side coupling members 140 are coupled to the head main body 30 (the jet unit), a jet-side branch path branches from an ink flow path 20 (a liquid flow path) into which the ink inflows from the outside of the inkjet head 5, or from which the ink outflows to the outside of the inkjet head 5, the jet-side branch path is communicated with the jet flow path 32, the jet-side branch path is provided to each of the jet-side coupling members 140, and the cooling-side coupling members 150 are respectively coupled to the jet-side coupling members 140, and are each provided with a cooling-side branch path which branches from the ink flow path 20, and which is communicated with the cooling flow path 42.

[Head Main Body 30]

The head main body 30 has a rectangular box-like shape. On a lower surface of the head main body 30, there is disposed a nozzle array not shown for jetting the ink. The head main body 30 is supported by a base member 31 to be installed in the carriage 29. The base member 31 is formed so as to be longer in the X direction than the head main body 30. On a lower surface of the base member 31, there is formed an elongated hole not shown for exposing the nozzle array of the head main body 30.

[Drive Circuits 35]

The drive circuits 35 are each a driver IC for controlling, for example, an operation of the head main body 30 and an operation of the circulation mechanism. The drive circuits 35 have thermal contact with the cooling member 50. In the example shown in the drawings, the drive circuits 35 have indirect contact with the cooling member 50 via an insulating member 36. The insulating member 36 is a sheet-like member formed of an insulating material such as silicon. It should be noted that the heat sources are not limited to the drive circuits 35 such as driver ICs. The heat sources are only required to be what generates heat when performing driving, and can be other electronic components.

[Board Unit 60]

The inkjet head 5 is provided with a board unit 60 on which the drive circuits 35 are mounted. The board unit 60 is provided with a board main body 61 on which a plurality of electric circuits are mounted, and a flexible board 62 for electrically coupling the board main body 61 and drive electrodes (electrodes on the drive walls) of the actuator plate described above.

The board main body 61 is, for example, a rigid board. The board main body 61 is coupled to the cooling member 50 and so on via a coupling member not shown. In an upper part of the board main body 61, there are disposed connectors 65. The board main body 61 is electrically coupled to a main controller, a power supply, and so on located outside via the connectors 65.

It should be noted that the board main body 61 can be a flexible board. In this case, it is possible to extend a part of the board main body 61 to the outside of the inkjet head 5 to directly be coupled to the printer 1 without providing the connectors 65 to the board main body 61.

The flexible board 62 extends obliquely downward so as to get away in the Y direction from the board main body 61. The part extending obliquely downward in the flexible board 62 is coupled to the drive electrodes of the actuator plate described above.

On the flexible board 62, there are mounted a plurality of the drive circuits 35 in a straight line at intervals in the X direction. The drive circuits 35 are each the driver IC, and are high in amount of heat generation. Therefore, there are disposed support members 70 for receiving heat from the drive circuits 35. In FIG. 3, the support members 70 are represented by dashed-two dotted lines.

[Support Members 70]

The support members 70 are formed of a material excellent in thermal conductivity and radiation performance such as aluminum. The support members 70 are disposed as a pair of members in the Y direction via the cooling member 50 and so on. The support members 70 are each provided with a main body portion 71 extending in the X direction, end side fixation portions 72 disposed in both end portions in the X direction of the main body portion 71, and a lower middle fixation portion 73 disposed at a lower side of a central portion in the X direction of the main body portion 71.

The main body portion 71 is formed to have a plate-like shape. The main body portion 71 is opposed to the drive circuits 35 in the Y direction via the flexible board 62. The main body portion 71 has thermal contact with the drive circuits 35.

The end side fixation portions 72 extend toward both sides in the Z direction from the both end portions of the main body portion 71. The pair of support members 70 are screwed in the respective end side fixation portions 72 via through holes 57 of the cooling member 50.

The lower middle fixation portion 73 extends toward the −Z side from a lower side of the central portion in the X direction of the main body portion 71. The pair of support members 70 are screwed in the respective lower middle fixation portions 73 via a lower middle recessed part 58 of the cooling member 50.

[Coupling Members 140, 150]

The inkjet heads 5 are each provided with the jet-side coupling members 140 and the cooling-side coupling members 150. The coupling members 140, 150 are each formed of a resin material such as polyethylene, polycarbonate, polypropylene, polyethylene terephthalate, or polyphenylene sulfide. The jet-side coupling members 140 and the cooling-side coupling members 150 are disposed so as to couple an entrance side and a head main body 30 side of the cooling flow path 42 to each other, and an exit side and the head main body 30 side of the cooling flow path 42 to each other.

The jet-side coupling members 140 and the cooling-side coupling members 150 constitute dual-partitioning coupling structures 80, 90 in which the jet-side coupling member 140 and the cooling-side coupling member 150 are coupled to each other in a divisible manner. The dual-partitioning coupling structure 80 coupled to the entrance side of the cooling flow path 42 is hereinafter referred to as an “entrance-side coupling structure 80.” The dual-partitioning coupling structure 90 coupled to the exit side of the cooling flow path 42 is referred to as an “exit-side coupling structure 90.” Each of the coupling structures 80, 90 is formed to have an L shape.

The entrance-side coupling structure 80 is disposed at one side (the +X side) in the X direction of the inkjet head 5. The entrance-side coupling structure 80 is provided with an entrance port 81 to which the ink supply tube 21 described above is coupled. The entrance-side coupling structure 80 is attached to one side (the +X side) in the X direction of the head main body 30 via a fastener member such as a bolt.

The entrance-side coupling structure 80 has a first inflow branch path 82 (the jet-side branch path) and a second inflow branch path 83 (the cooling-side branch path) branching from an inflow path (the liquid flow path) into which the ink inflows from the entrance port 81. The first inflow branch path 82 is a path for guiding the ink from the inflow path of the entrance port 81 into the head main body 30 (the jet flow path 32). The second inflow branch path 83 is a path for guiding the ink from the inflow path of the entrance port 81 into the cooling pipe 41 (the cooling flow path 42).

The exit-side coupling structure 90 is disposed at the other side (the −X side) in the X direction of the inkjet head 5. The exit-side coupling structure 90 is provided with an exit port 91 to which the ink discharge tube 22 described above is coupled. The exit-side coupling structure 90 is attached to the other side (the −X side) in the X direction of the head main body 30 via a fastener member such as a bolt.

The exit-side coupling structure 90 has a first outflow branch path 92 (the jet-side branch path) and a second outflow branch path 93 (the cooling-side branch path) branching from an outflow path (the liquid flow path) from which the ink outflows to the exit port 91. The first outflow branch path 92 is a path for guiding the ink from the inside of the head main body 30 (the jet flow path 32) to the outflow path of the exit port 91. The second outflow branch path 93 is a path for guiding the ink from the inside of the cooling pipe 41 (the cooling flow path 42) to the outflow path of the exit port 91.

The description will hereinafter be presented citing the jet-side coupling member 140 and the cooling-side coupling member 150 which constitute the entrance-side coupling structure 80. The jet-side coupling member 140 and the cooling-side coupling member 150 which constitute the exit-side coupling structure 90 have substantially the same configuration as those of the jet-side coupling member 140 and the cooling-side coupling member 150 which constitute the entrance-side coupling structure 80 except an installation orientation and so on, and therefore, the detailed description thereof will be omitted.

The jet-side coupling member 140 is provided with a jet-side branch path 141 which branches from the ink flow path 20, and which is communicated with the jet flow path 32. The jet-side branch path 141 (hereinafter also referred to as a "downside path 141") provided to the jet-side coupling member 140 is communicated with a jet-side branch path 151 (hereinafter also referred to as an "upside path 151") provided to the cooling-side coupling member 150. The downside path 141 extends in the X direction from a portion communicated with the upside path 151, then bends to extend in the Z direction toward the jet flow path 32. The downside path 141 is formed to have an L shape in the cross-sectional view shown in FIG. 4. In the jet-side coupling member 140, on a surface (+X-side surface) having contact with the cooling-side coupling member 150, there is formed a ring-like recessed part 145 for housing a ring-like member 146. For example, the ring-like member 146 is a sealing member such as an O-ring.

The cooling-side coupling member 150 is provided with the cooling-side branch path 83 which branches from the ink flow path 20, and which is communicated with the cooling flow path 42, and the upside path 151 which branches from the ink flow path 20, and which is communicated with the downside path 141. The upside path 151 corresponds to the jet-side branch path provided to the cooling-side coupling member 150. The upside path 151 extends in the Z direction from a portion communicated with the ink flow path 20, then bends to extend in the X direction toward the downside path 141. The upside path 151 is formed to have an L shape in the cross-sectional view shown in FIG. 4.

[Cooling Pipe 41]

The cooling pipe 41 has a corrosion resistance to the ink. Here, the corrosion resistance means a rate at which the corrosion progresses when dipped into the ink. The cooling pipe 41 is higher in corrosion resistance compared to the cooling member 50. Here, the fact that the corrosion resistance is high means that the corrosion with respect to the ink progresses slowly. The cooling pipe 41 is formed of, for example, stainless steel.

It should be noted that the cooling pipe 41 can be formed of copper alloy, titanium alloy, nickel alloy, chromium alloy, or the like. It is preferable for the cooling pipe 41 to be formed of a material higher in corrosion resistance to the ink compared to the cooling member 50. For example, it is possible to change the constituent material of the cooling pipe 41 in accordance with a design specification.

The cooling pipe 41 branches from a flow path (the liquid flow path) of the entrance port 81 through which the ink passes. The cooling pipe 41 has the cooling flow path 42 through which the ink passes as the cooling medium. The cooling flow path 42 communicates with the second inflow branch path 83 of the entrance-side coupling structure 80, and the second outflow branch path 93 of the exit-side coupling structure 90.

For example, when activating the pressure pump 24 and the suction pump 25, the ink located in the ink tank 4 is sent to the head main body 30 and the cooling pipe 41 passing through the entrance port 81, the first inflow branch path 82, and the second inflow branch path 83 of the entrance-side coupling structure 80 in sequence. Subsequently, the ink is returned to the inside of the ink tank 4 passing through the first outflow branch path 92, the second outflow branch path 93, and the exit port 91 of the exit-side coupling structure 90 in sequence.

The cooling pipe 41 is formed by insert molding with respect to the cooling member 50. Here, the insert molding means inserting a material around a component set in a mold and molding the component and the material as a single component. The cooling pipe 41 in the present embodiment is molded as a single component with the material of the cooling member 50 being inserted around the cooling pipe 41 set in a mold. The component obtained by integrating the cooling pipe 41 and the cooling member 50 with each other is hereinafter referred to as the "cooling unit 40."

The cooling pipe 41 has a straight-pipe shape. The cooling pipe 41 extends linearly along the X direction. The cooling pipe 41 has a cylindrical shape extending along the X direction.

End portions of the cooling pipe 41 are arranged outside an outer shape of the cooling member 50. One (a +X-side end portion) of the end portions of the cooling pipe 41 is arranged outside (at the +X side of) one side surface (the +X-side surface) of the cooling member 50. The other (a −X-side end portion) of the end portions of the cooling pipe 41 is arranged outside (at the −X side of) the other side surface (the −X-side surface) of the cooling member 50. A part (a part at a center side in the X direction) other than the both end portions in the X direction in the cooling pipe 41 is embedded in the cooling member 50.

There is disposed the single cooling pipe 41 in the example shown in the drawings, but this is not a limitation. For example, there can be disposed a plurality of the cooling pipes 41. For example, it is possible to change the number of the cooling pipes 41 installed therein in accordance with the design specification.

The cross-sectional shape of the cooling pipe 41 (the shape of the cooling pipe 41 cut along the Y-Z plane) is the ring-like shape in the example shown in the drawings, but this is not a limitation. For example, the cross-sectional shape of the cooling pipe 41 can be a rectangular frame shape. For example, it is possible to change the cross-sectional shape of the cooling pipe 41 in accordance with the design specification.

[Cooling Member 50]

The cooling member 50 has higher thermal conductivity than that of the cooling pipe 41. The cooling member 50 is formed to have a rectangular solid shape having a longitudinal direction in the X direction. The cooling member 50 is formed of, for example, aluminum simple body or aluminum alloy.

It should be noted that the cooling member 50 can also be formed of zinc alloy. It is preferable for the cooling member 50 to be formed of a material having higher thermal conductivity compared to that of the cooling pipe 41. For example, it is possible to change the constituent material of the cooling member 50 in accordance with the design specification.

The cooling member 50 has a first surface 51 (a −Y-side surface) and a second surface 52 (a +Y-side surface) arranged at respective sides opposite to each other across the cooling pipe 41. The first surface 51 is a surface along the X-Z plane at the −Y side of the cooling pipe 41. The second surface 52 is a surface along the X-Z plane at the +Y side of the cooling pipe 41.

The cooling member 50 has recessed parts 53A, 53B in at least a part of a portion surrounding the cooling pipe 41. The recessed parts 53A, 53B open toward four directions crossing the central axis of the cooling pipe 41. The four directions are a direction at the +Z side and the −Y side, a direction at the −Z side and the −Y side, a direction at the +Z side and the +Y side, and a direction at the −Z side and the +Y side with respect to the central axis of the cooling pipe 41 when viewed from the X direction.

In the example shown in the drawings, there are shown a first upside recessed part 53A formed at an upper side (the +Z side) of the first surface 51 of the cooling member 50, and a first downside recessed part 53B formed at a lower side (the −Z side) of the first surface 51 of the cooling member 50 are shown out of the recessed parts 53A, 53B opening in the four directions. The illustration of a second upside recessed part formed at the upper side of the second surface 52 of the cooling member 50 and a second downside recessed part formed at the lower side of the second surface 52 of the cooling member 50 is omitted.

The cooling member 50 has heat source arrangement surfaces 56 on which the drive circuits 35 are respectively arranged. In the example shown in the drawings, the heat source arrangement surfaces 56 are represented by dashed-dotted lines. The heat source arrangement surfaces 56 are disposed in other portions than the recessed parts 53A, 53B in the cooling member 50.

In the example shown in the drawings, the recessed parts 53A, 53B are each formed to have a rectangular shape having round corners when viewed from the Y direction. In the example shown in the drawings, six pairs of recessed parts 53A, 53B arranged side by side in the Z direction (the first upside recessed parts 53A and the first downside recessed parts 53B) are arranged at intervals in the X direction. In the X direction, the recessed parts 53A, 53B and the heat source arrangement surfaces 56 are alternately disposed. It should be noted that the shapes, the arrangement number, the arrangement places, and so on of the recessed parts 53A, 53B are not limited to the above, and can be changed in accordance with the design specification.

The heat source arrangement surfaces 56 are each a plane. The heat source arrangement surfaces 56 are disposed along the X-Z plane. The heat source arrangement surfaces 56 overlap the cooling pipe 41 when viewed from the Y direction. For example, it is preferable for the heat source arrangement surface 56 to have a larger outer shape than the outer shape of the drive circuit 35 when viewed from the Y direction. For example, when the drive circuit 35 has a rectangular shape when viewed from the Y direction, it is preferable for the heat source arrangement surface 56 to have a rectangular shape larger than the outer shape of the drive circuit 35. In the example shown in the drawings, the heat source arrangement surfaces 56 are arranged at five places at intervals in the X direction in a portion other than the pairs of recessed parts 53A, 53B each arranged side by side in the Z direction in the cooling member 50.

The heat source arrangement surfaces 56 are disposed in each of the first surface 51 and the second surface 52 of the cooling member 50. For example, the heat source arrangement surfaces 56 are arranged at five places (totally ten places in both of the first surface 51 and the second surface 52) at intervals in the X direction in other portion than the pairs of recessed parts 53A, 53B each arranged side by side in the Z direction on each of the first surface 51 and the second surface 52 of the cooling member 50. It should be noted that the shapes, the arrangement number, the arrangement places, and so on of the heat source arrangement surfaces 56 are not limited to the above, and can be changed in accordance with the design specification.

At an X-direction end portion side of the cooling member 50, there are formed the pair of through holes 57 which are arranged vertically, and which open in the Y direction. At a lower middle side in the X direction of the cooling member 50, there is formed the lower middle recessed part 58 recessed toward the +Z side from the lower surface of the cooling member 50. The through holes 57 and the lower middle recessed part 58 are portions through which the screws for fixing the pair of support members 70 pass. In the example shown in the drawings, the cooling member 50 is fixed to the pair of support members 70 via the screws at two places arranged vertically at each of the both ends in the X direction, and a single place at lower middle side in the X-direction, totally five places.

[Throttle Member 100]

Figure 7:
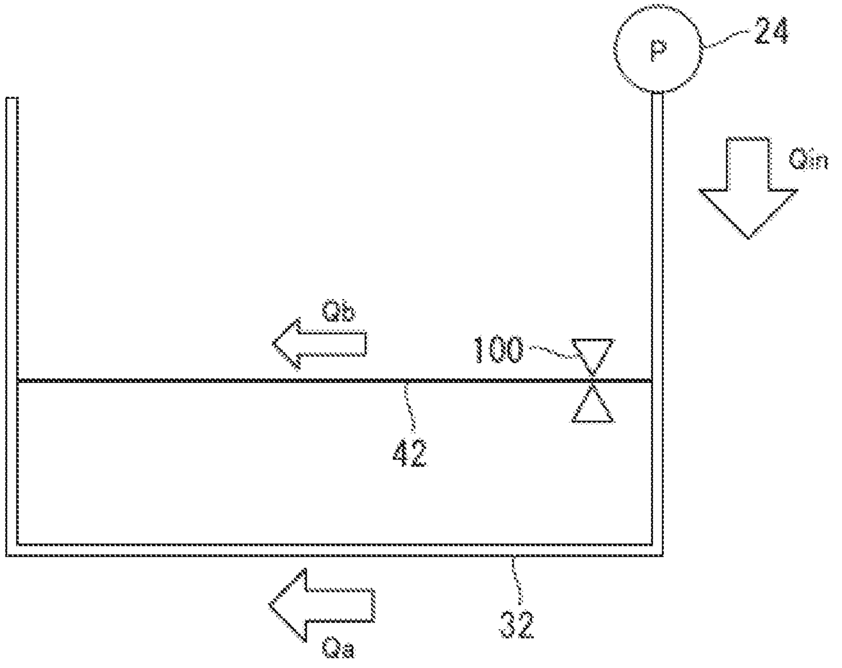
FIG. 7 is an explanatory diagram showing an installation place of a throttle member related to the embodiment.
Figure 8:
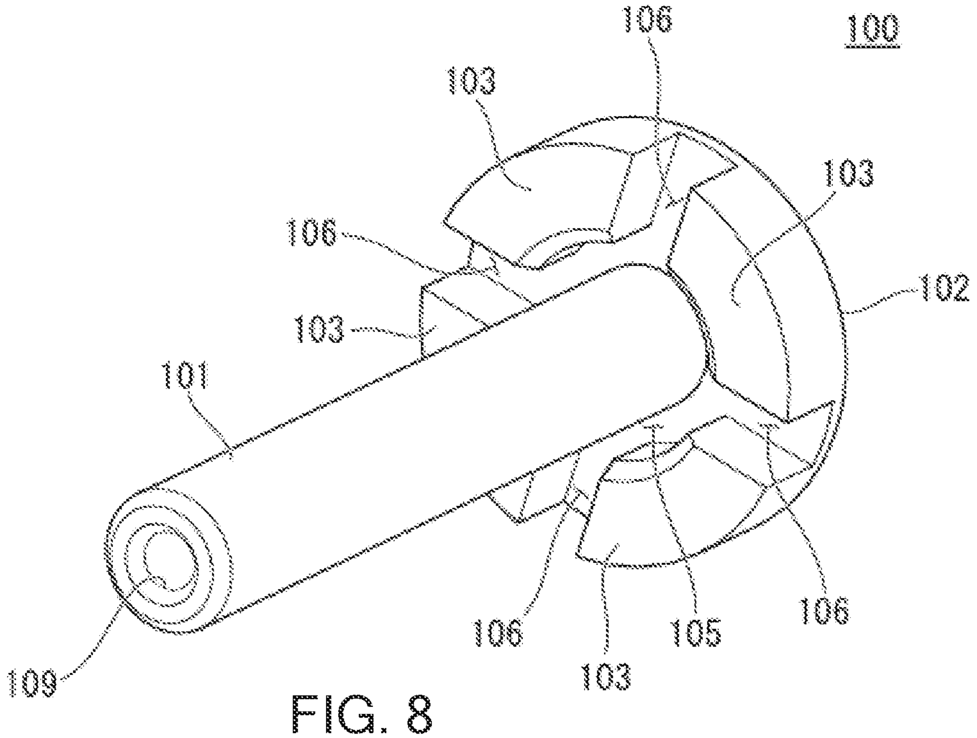
FIG. 8 is a perspective view of the throttle member related to the embodiment.
Figure 9:
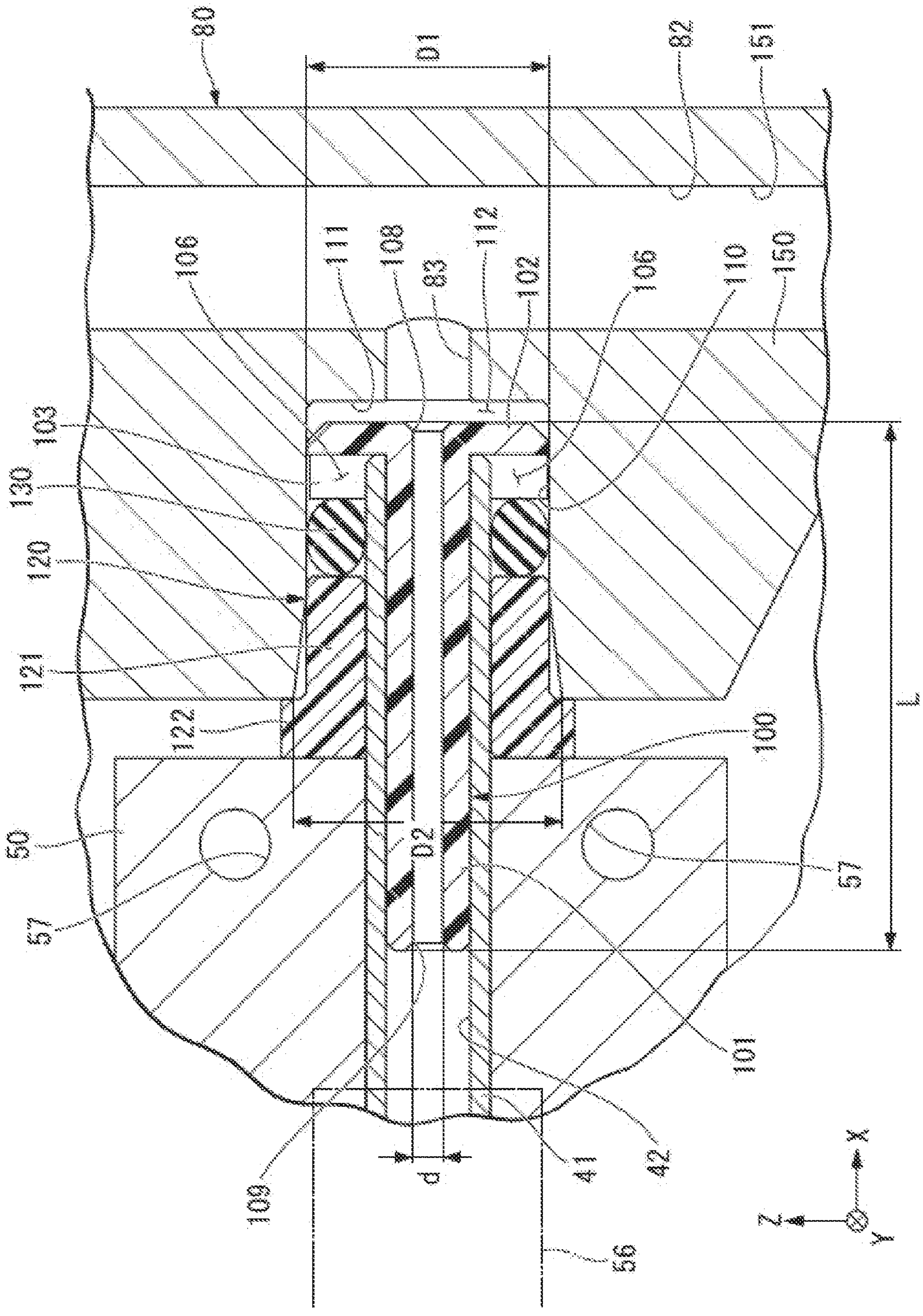
FIG. 9 is a cross-sectional view for explaining a coupling structure of a cooling-side coupling member related to the embodiment.

FIG. 7 is an explanatory diagram showing an installation place of a throttle member 100 related to the embodiment. FIG. 8 is a perspective view of the throttle member 100 related to the embodiment. FIG. 9 is a cross-sectional view for explaining a coupling structure of the cooling-side coupling member 150 related to the embodiment.

First, a pump system (an ink system located outside the inkjet head 5) for supplying the inkjet head 5 with the ink will be described. The pump system corresponds to a system including the ink circulation mechanism 6 (see FIG. 2) described above.

In the pump system, supply pressure (pump pressure) from the pressure pump 24 is raised in some cases so that the necessary amount of ink flows through the head main body 30 (the jet flow path 32) and the cooling pipe 41 (the cooling flow path 42). The total flow rate Qin of the ink supplied by the pump system at specific supply pressure is determined by a pipe line resistance in the inkjet head 5.

In the following formula (1), Qa denotes a flow rate to the jet flow path 32 in the total flow rate Qin of the ink, Qb denotes a flow rate to the cooling flow path 42 in the total flow rate Qin of the ink, Ra denotes a flow path resistance of the jet flow path 32, and Rb denotes a flow path resistance of the cooling flow path 42, respectively.

$$Qa/Qb=Rb/Ra \tag{1}$$

As expressed in the formula (1), a ratio between the flow rate Qa to the jet flow path 32 and the flow rate Qb to the cooling flow path 42 in the total flow rate Qin of the ink becomes a reciprocal ratio between the flow path resistances Ra, Rb in the respective flow paths, namely the jet flow path 32 and the cooling flow path 42.

For example, depending on the design specification and so on, a wide variety of types of ink different in viscosity and thermal conductivity are used in some cases using systems the same in specification, or using heads the same in specification. Depending on a difference in an ink type (the viscosity and the thermal conductivity), a change in viscosity of the ink with the temperature, ejection conditions (an ejection amount and a drive frequency), and an amount of heat generated by the driver IC, the optimum distribution (proportion) of the amounts of the ink which is made to flow into the respective flow paths changes. However, when the flow path resistance is constant in the flow paths, it is difficult to adjust the flow rate distribution of the flow paths.

For example, when increasing the pump pressure so that minimum required amount of the ink flows through one of the jet flow path 32 and the cooling flow path 42, the pump system increases in cost. However, when increasing the pump pressure in order to flow the necessary amount through one of the flow paths, it results in that the flow rate in the other of the flow paths also rises in proportion.

In contrast, in the present embodiment, there is provided the throttle member 100 for controlling the flow path resistance of at least one of the jet flow path 32 and the cooling flow path 42. In the example shown in FIG. 7, the throttle member 100 is disposed at an entrance side of the cooling flow path 42. Thus, it is possible to change a ratio of the pipe line resistance in accordance with the type of the ink to be used, an ejection condition, and so on. Therefore, it is possible to minimize the flow rate at the ejection side (the flow rate to the jet flow path 32) and the driver IC cooling side (the flow rate to the cooling flow path 42) necessary for each of the inkjet heads 5.

The pipe line resistance increases in proportion to the length of the flow path, and at the same time, in inverse proportion to the diameter of the flow path. Therefore, it is preferable to prepare a plurality of types of throttle members 100 different in inner diameter or length from each other, and then select suitable one in accordance with the ink type, the ejection condition, and so on. For example, it is possible to select the throttle member 100 by measuring a total amount of the ink flowing through the inkjet head 5 and an amount of ejection.

In the example shown in FIG. 4, the throttle member 100 is disposed at each of an entrance side and an exit side of the cooling flow path 42. For example, the throttle member 100 disposed at the entrance side of the cooling flow path 42 has the same shape as the shape of the throttle member 100 disposed at the exit side of the cooling flow path 42. The description will hereinafter be presented citing the throttle member 100 disposed at the entrance side of the cooling flow path 42. The throttle member 100 disposed at the exit side of the cooling flow path 42 has substantially the same configuration as that of the throttle member 100 disposed at the entrance side of the cooling flow path 42 except the installation direction and so on, and therefore, the detailed description of the throttle member 100 disposed at the exit side of the cooling flow path 42 will be omitted.

The throttle member 100 is formed of a resin material such as polyethylene, polycarbonate, polypropylene, polyethylene terephthalate, or polyphenylene sulfide. For example, the throttle member 100 can be formed of the same material as that of the coupling members 140, 150.

The throttle member 100 is made to detachably be attached to the cooling pipe 41. The throttle member 100 is made to be able to be replaced with other throttle members different in flow path resistance from the throttle member 100 described above. As shown in FIG. 8 and FIG. 9, the throttle member 100 is provided with a cylindrical part 101 extending along the cooling flow path 42, and a flared part 102 flared outward to the outside of the end portion of the cooling pipe 41 from the cylindrical part 101.

The cylindrical part 101 has a straight-pipe shape smaller than the cooling pipe 41. The cylindrical part 101 extends linearly along the X direction. The cylindrical part 101 has a cylindrical shape extending along the X direction. The inner diameter of the cylindrical part 101 is smaller than the inner diameter of the cooling pipe 41. The outer diameter of the cylindrical part 101 has a size no larger than the inner diameter of the cooling pipe 41. For example, the outer diameter of the cylindrical part 101 can be substantially the same as the inner diameter of the cooling pipe 41. For example, when the throttle member 100 is attached to or detached from the cooling pipe 41, the outer circumferential surface of the cylindrical part 101 can have slidable contact with an inner circumferential surface of the cooling pipe 41.

The flared part 102 is provided with elastically deforming parts 103 which extend from the flared part 102 along the outer circumferential surface of the cooling pipe 41, and which can elastically deform. The throttle member 100 has a ring-like groove 105 to which the end portion of the cooling pipe 41 is inserted, and radial grooves 106 radially extending from the ring-like groove 105 so as to zone the elastically deforming parts 103 in a circumferential direction of the cylindrical part 101. The ring-like groove 105 is formed to have a ring-like shape along the end portion of the cooling pipe. The radial grooves 106 are formed so as to extend from the ring-like groove 105 in four directions crossing the central axis of the cylindrical part 101.

The throttle member 100 has a throttle entrance 108 to which the ink (the liquid) inflows, and a throttle exit 109 from which the ink outflows. The aperture area of the throttle exit 109 is the same as the aperture area of the throttle entrance 108. The aperture area of the throttle member 100 has a uniform size throughout the whole length in the X direction.

In FIG. 9, a reference symbol d represents the inner diameter of the throttle member 100, and a reference symbol L represents the length of the throttle member 100. The inner diameter d of the throttle member 100 corresponds to the inner diameter of the cylindrical part 101. The length L of the throttle member 100 corresponds to the length of an area between the tip (the −X-side end) of the cylindrical part 101 and one end (the +X-side end) of the flared part 102.

The cooling-side coupling member 150 has a housing recess 110 for housing the end portion of the cooling pipe 41. Between a bottom surface 111 of the housing recess 110 and the end portion of the cooling pipe 41, there is disposed a gap 112. The housing recess 110 is formed to have a cylindrical shape extending along the end portion side of the cooling pipe 41. The housing recess 110 increases in diameter toward a direction of getting away from the bottom surface 111 of the housing recess 110 in the axial direction of the housing recess 110. The housing recess 110 houses the flared part 102 of the throttle member 100. The housing recess 110 opens toward the one side surface (the +X-side surface) of the cooling member 50. The housing recess 110 increases in diameter toward a direction toward the one side surface (the +X-side surface) of the cooling member 50 from a middle in the axial direction of the housing recess 110. The gap 112 intervenes between the bottom surface 111 (the −X-side surface) of the housing recess 110 and the one side surface (the +X-side surface) of the flared part 102.

There can be disposed a spacer 120 and an elastic member 130 between the one side surface (the +X-side surface) of the cooling member 50 and the other side surface (the −X-side surface) of the flared part 102.

The spacer 120 is made to detachably be attached to the cooling pipe 41. The spacer 120 is formed to have a cylindrical shape extending along an outer circumferential surface of the cooling pipe 41. At least a part of the spacer 120 is disposed between the cooling member 50 and the cooling-side coupling member 150. The spacer 120 is provided with a first intervening part 121 housed in the housing recess 110, and a second intervening part 122 arranged between the one side surface (the +X-side surface) of the cooling member 50 and the first intervening part 121.

An outer diameter of the first intervening part 121 is a size no larger than a minimum diameter D1 of the housing recess 110. The minimum diameter D1 of the housing recess 110 corresponds to an inner diameter of a portion (a portion located at the +X-direction side of an increased-diameter part) in which the diameter of the housing recess 110 is not increased. For example, the outer diameter of the first intervening part 121 can be substantially the same as the minimum diameter D1 of the housing recess 110. For example, when the cooling-side coupling member 150 is attached to or detached from the spacer 120, an outer circumferential surface of the first intervening part 121 can have slidable contact with an inner circumferential surface of the housing recess 110.

An outer diameter of the second intervening part 122 is larger than a maximum diameter D2 of the housing recess 110. The maximum diameter D2 of the housing recess 110 corresponds to an inner diameter of a portion (an increased-diameter part located at the extreme −X-direction side) in which the diameter of the housing recess 110 is maximally increased. The outer circumferential part of the second intervening part 122 is sandwiched between the one side surface (the +X-side surface) of the cooling member 50 and the one side surface (the −X-side surface) of the cooling-side coupling member 150. The one side surface (the +X-side surface) of the second intervening part 122 has direct contact with the one side surface (the −X-side surface) of the cooling-side coupling member 150. The other side surface (the −X-side surface) of the second intervening part 122 has direct contact with the one side surface (the +X-side surface) of the cooling member 50.

The elastic member 130 is a sealing member such as an O-ring. The elastic member 130 is made to detachably be attached to the cooling pipe 41. For example, the elastic member 130 is formed of an elastic material. The elastic member 130 has a ring-like shape along the outer circumference of the cooling pipe 41. The elastic member 130 is disposed between the first intervening part 121 of the spacer 120 and the flared part 102 of the throttle member 100.

For example, the elastic member 130 has a circular cross-sectional surface uniform throughout the whole length in the circumferential direction of the elastic member 130 in a state (an initial state before an elastic deformation) in which the elastic member 130 is not installed in the inkjet head 5. In contrast, in a state (the state shown in FIG. 9) in which the elastic member 130 has been installed in the inkjet head 5, the elastic member 130 is elastically squeezed by members adjacent to each other. In the example shown in FIG. 9, a part of the elastic member 130 is squeezed by parts of the members (the outer circumferential surface of the cooling pipe 41, the flared part 102 of the throttle member 100, the inner circumferential surface of the housing recess 110, and the first intervening part 121 of the spacer 120) adjacent to each other.

The outer diameter of the elastic member 130 which has not elastically deformed is smaller than the maximum diameter D2 of the housing recess 110, and at the same time, larger than the minimum diameter D1 of the housing recess 110. The outer diameter of the elastic member 130 which has not elastically deformed corresponds to the outer diameter of the elastic member 130 in the state (the initial state before the elastic deformation) in which the elastic member 130 has not installed in the inkjet head 5.

The throttle member 100 is disposed in a portion other than the portion overlapping the heat source arrangement surface 56 in the cooling pipe 41. The throttle member 100 is disposed in a portion other than the portion overlapping the heat source arrangement surface 56 when viewed from the Y direction. The tip (the −X-side end) of the cylindrical part 101 in the throttle member 100 is arranged at the outer side (the +X direction side) of an outer end in the X direction (the +X-side end of the heat source arrangement surface 56 located at the extreme +X-direction side) of the heat source arrangement surface 56.

[Dual-Partitioning Coupling Structure]

Figure 10:
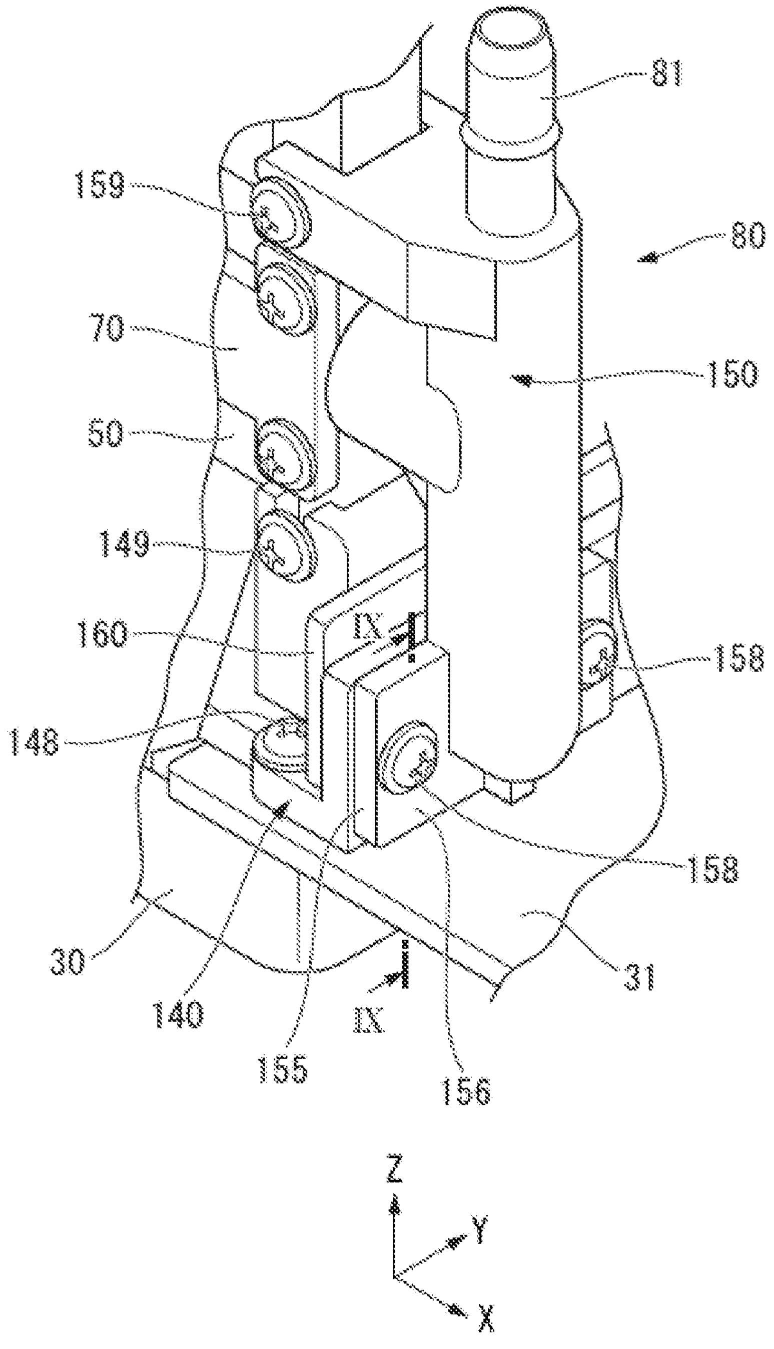
FIG. 10 is a perspective view of a dual-partitioning coupling structure related to the embodiment.
Figure 11:
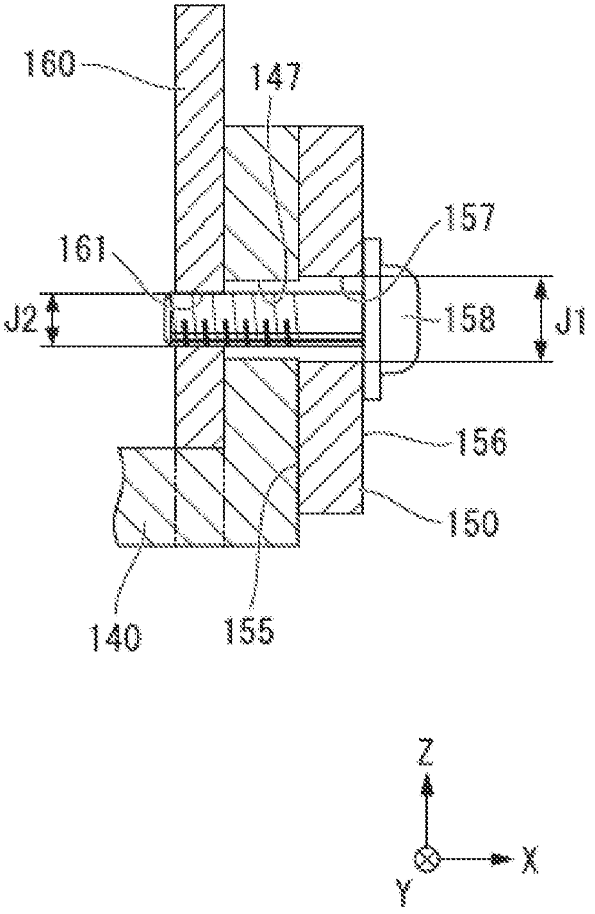
FIG. 11 is a cross-sectional view along an arrow IX-IX shown in FIG. 10.
Figure 12:
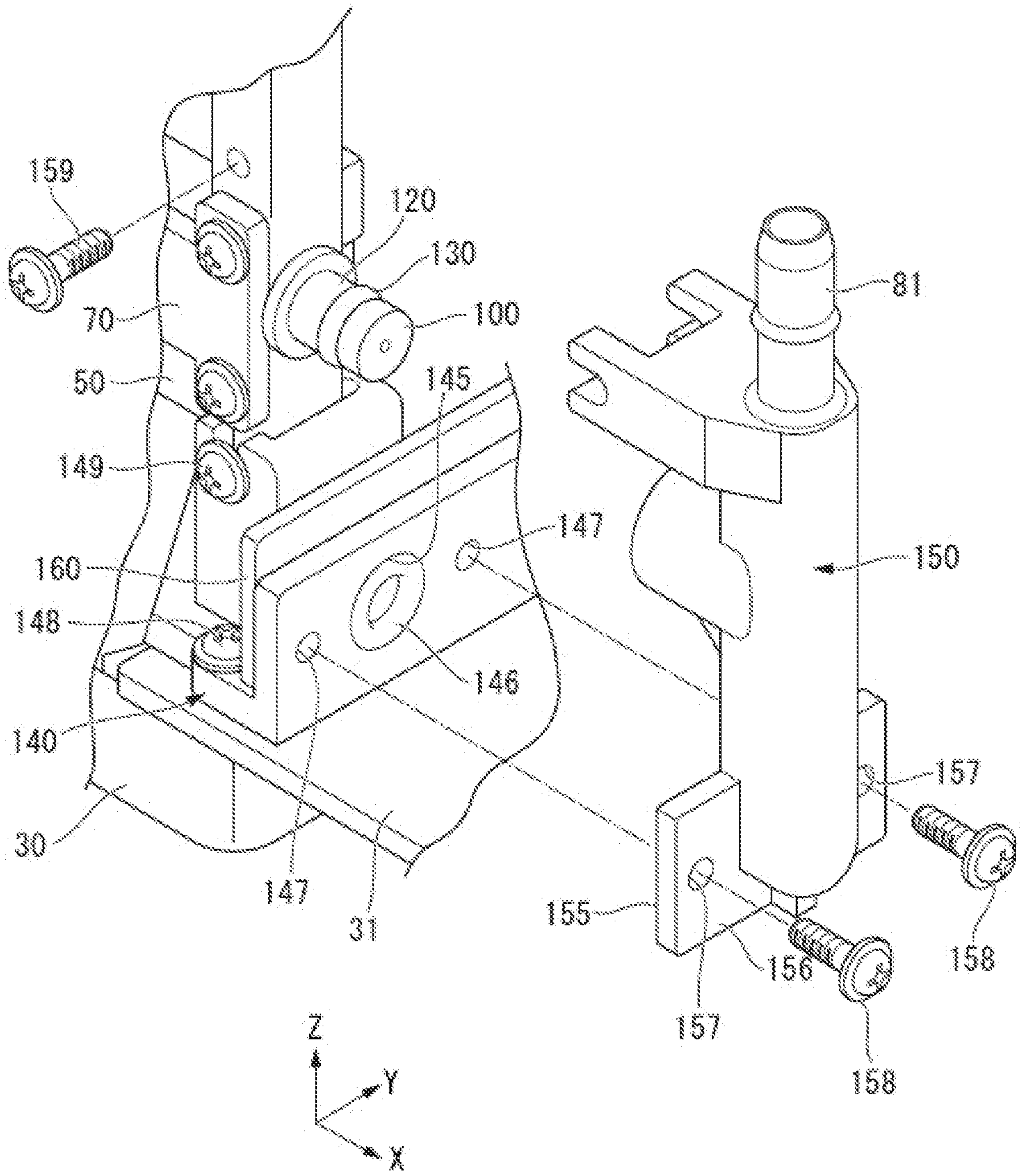
FIG. 12 is an exploded perspective view of a dual-partitioning coupling structure related to the embodiment.

FIG. 10 is a perspective view of a dual-partitioning coupling structure related to the embodiment. FIG. 11 is a cross-sectional view along an arrow IX-IX shown in FIG. 10. FIG. 12 is an exploded perspective view of the dual-partitioning coupling structure related to the embodiment. A coupling state of the entrance-side coupling structure 80 out of the dual-partitioning coupling structures will hereinafter be described. The coupling state of the exit-side coupling structure 90 is substantially the same as the coupling state of the entrance-side coupling structure 80 except the arrangement orientation and so on, and therefore, the detailed description thereof will be omitted.

The jet-side coupling member 140 is coupled to the head main body 30 (the jet unit). The jet-side coupling member 140 is attached to an upper surface of the base member 31 via a fixation member such as a bolt. A lower surface of the jet-side coupling member 140 has contact with the upper surface of the base member 31. The jet-side coupling member 140 is fixed to the base member 31 with one surface along the X-Y plane. In the drawing, there is shown a first jet-side bolt 148 as an example of the fixation member for fixing the jet-side coupling member 140 to the base member 31.

The jet-side coupling member 140 is coupled to the cooling member 50. The jet-side coupling member 140 is attached to one surface (the −Y-side surface) of the cooling member 50 via a fixation member such as a bolt. The jet-side coupling member 140 is fixed to the cooling member 50 with one surface along the X-Z plane. In the drawing, there is shown a second jet-side bolt 149 as an example of the fixation member for fixing the jet-side coupling member 140 to the cooling member 50.

A lower portion of the cooling-side coupling member 150 is coupled to the jet-side coupling member 140. The lower portion of the cooling-side coupling member 150 is attached to one surface (the +X-side surface) of a fastening target member 160 together with the jet-side coupling member 140 via fixation members such as bolts. The lower portion of the cooling-side coupling member 150 is coupled to the jet-side coupling member 140 via a ring-like member 146.

The cooling-side coupling member 150 has a coupling surface 155 along one surface (the +X-side surface) of the jet-side coupling member 140, and along a direction perpendicular to the cooling pipe 41. The coupling surface 155 of the cooling-side coupling member 150 has contact with the +X-side surface of the jet-side coupling member 140. The cooling-side coupling member 150 is fixed to the fastening target member 160 with one surface along the Y-Z plane together with the jet-side coupling member 140. In the drawing, there are shown first cooling-side bolts 158 as an example of the fixation members for fixing the cooling-side coupling member 150 to the fastening target member 160. The first cooling-side bolts 158 are disposed as a pair of bolts arranged in the Y direction.

An upper portion of the cooling-side coupling member 150 is coupled to the cooling member 50. The upper portion of the cooling-side coupling member 150 is attached to the one surface (the −Y-side surface) of the cooling member 50 via a fixation member such as a bolt. The cooling-side coupling member 150 is fixed to the cooling member 50 with one surface along the X-Z plane. In the drawing, there is shown a second cooling-side bolt 159 as an example of the fixation member for fixing the cooling-side coupling member 150 to the cooling member 50.

The cooling-side coupling member 150 is fixed to the fastening target member 160 with the first cooling-side bolts 158 via a seating part 156 provided with through-holes 157 for the first cooling-side bolts 158 (bolts). The seating part 156 is a plate-like part flared outward at both sides in the Y direction from a cylindrical part provided with the upside path 151 in the cooling-side coupling member 150. In the seating part 156, on the outer periphery of each of the through-holes 157, there is seated a head part of corresponding one of the first cooling-side bolts 158. The through-holes 157 are each a circular hole penetrating the seating part 156 in the X direction. An inner diameter J1 of the through-hole 157 is larger than a maximum diameter J2 of an external thread part of the first cooling-side bolt 158.

The fastening target member 160 erects through a lower opening of the jet-side coupling member 140. The fastening target member 160 extends in a direction (the Z direction) perpendicular to the cooling pipe 41. The fastening target member 160 is provided with internal thread parts 161 engaging with the respective external thread parts of the first cooling-side bolts 158.

A portion overlapping the through-holes 157 (hereinafter also referred to as "first through-holes 157") of the cooling-side coupling member 150 in the jet-side coupling member 140 is provided with second through-holes 147. The second through-holes 147 are each a circular hole penetrating a portion overlapping the seating part 156 in the jet-side coupling member 140 in the X direction. An inner diameter of the second through-hole 147 is larger than the maximum diameter of the external thread part of the first cooling-side bolt 158.

[Method of Manufacturing Inkjet Head 5]

A method of manufacturing the inkjet head 5 according to the present embodiment is a method of manufacturing the inkjet head 5 provided with the head main body 30 for jetting the ink, the cooling pipe 41 which has the corrosion resistance to the ink, and through which the ink for cooling the drive circuits 35 passes, and the cooling member 50 having higher thermal conductivity than that of the cooling pipe 41, wherein molding is performed in the state of supporting the cooling pipe 41 in the step of manufacturing the cooling member 50.

The method of manufacturing the inkjet head includes a head main body preparation step of preparing the head main body 30, a cooling unit manufacturing step (a step of manufacturing the cooling member 50) of manufacturing the cooling unit 40, and a unit coupling step of coupling the head main body 30 and the cooling unit 40 to each other.

In the head main body preparation step, there is prepared the head main body 30 including the actuator plate, the nozzle plate, and so on described above. After the head main body preparation step, there is made the transition to the cooling unit manufacturing step.

In the cooling unit manufacturing step, there are prepared a pair of metal molds (not shown) constituting the mold for manufacturing the cooling unit 40, and the cooling pipe 41 constituting the cooling unit 40. For example, the pair of metal molds are a first metal mold corresponding to a −Y-side portion of the cooling unit 40, and a second metal mold corresponding to a +Y-side portion of the cooling unit 40.

Then, one of the pair of metal molds is made to support the cooling pipe 41. Then, the pair of metal molds are combined with each other. For example, the matching surface of the first metal mold and the matching surface of the second metal mold are made to have contact with each other.

Then, molten aluminum (about 680° C.) is poured into the mold. For example, in the state in which the pair of metal molds are combined with each other, the molten metal described above is poured into an internal space (around the cooling pipe 41) through a hole not shown. In the cooling unit manufacturing step, the molding is performed in the state of supporting the cooling pipe 41. After the molding, the mold is separated. Thus, the cooling unit 40 having the cooling pipe 41 and the cooling member 50 integrated with each other is obtained. After the cooling unit manufacturing step, there is made the transition to the unit coupling step.

In the unit coupling step, the board unit 60, the support member 70, the coupling structures 80, 90, and so on described above are coupled to the head main body 30 and the cooling unit 40 with coupling members, fastening members, or the like not shown.

The unit coupling step in the present embodiment includes a jet-side coupling step (a step of coupling the jet-side coupling member 140), and a cooling-side coupling step (a step of coupling the cooling-side coupling member 150).

In the jet-side coupling step, the jet-side coupling member 140 is attached to the upper surface of the base member 31 with the first jet-side bolt 148. Thus, the jet-side coupling member 140 is fixed to the base member 31 with the one surface along the X-Y plane.

In the jet-side coupling step, the jet-side coupling member 140 is attached to the one surface (the −Y-side surface) of the cooling member 50 with the second jet-side bolt 149. Thus, the jet-side coupling member 140 is fixed to the cooling member 50 with the one surface along the X-Z plane. After the jet-side coupling step, there is made the transition to the cooling-side coupling step.

In the cooling-side coupling step, the cooling-side coupling member 150 is coupled to the jet-side coupling member 140 in the state in which the jet-side coupling member 140 is coupled to the head main body 30.

In the cooling-side coupling step, the cooling-side coupling member 150 is attached to the one surface of the fastening target member 160 together with the jet-side coupling member 140 with the first cooling-side bolts 158. Thus, the cooling-side coupling member 150 is fixed to the fastening target member 160 with the one surface along the Y-Z plane together with the jet-side coupling member 140.

In the cooling-side coupling step, the cooling-side coupling member 150 is attached to the one surface (the −Y-side surface) of the cooling member 50 with the second cooling-side bolt 159. Thus, the cooling-side coupling member 150 is fixed to the cooling member 50 with the one surface along the X-Z plane.

For example, after fixing the cooling-side coupling member 150 to the cooling member 50 with the one surface along the X-Z plane using the second cooling-side bolt 159, the cooling-side coupling member 150 is fixed to the fastening target member 160 with the one surface along the Y-Z plane using the first cooling-side bolt 158. As described above, the cooling-side coupling member 150 has the seating part 156 provided with the first through-holes 157 through which the first cooling-side bolts 158 respectively pass. For example, the external thread parts of the first cooling-side bolts 158 are engaged with the respective internal thread parts 161 of the fastening target member 160 through the first through-holes 157 of the cooling-side coupling member 150 and the second through-holes 147 of the jet-side coupling member 140. Thus, the cooling-side coupling member 150 is fixed to the fastening target member 160 together with the jet-side coupling member 140.

Due to the steps described hereinabove, the inkjet head 5 is obtained.

Functions and Advantages

The inkjet heads 5 in the present embodiment jet the ink. The inkjet heads 5 are each provided with the head main body 30, the cooling pipe 41, the jet-side coupling members 140, and the cooling-side coupling members 150, wherein the head main body 30 has the jet flow path 32 through which the ink passes, the cooling pipe 41 has the cooling flow path 42 through which the ink passes as the cooling medium for cooling the drive circuits 35, the jet-side coupling members 140 are coupled to the head main body 30, the jet-side branch path branches from the ink flow path 20 into which the ink inflows from the outside of the inkjet head 5, or from which the ink outflows to the outside of the inkjet head 5, the jet-side branch path is communicated with the jet flow path 32, the jet-side branch path is provided to each of the jet-side coupling members 140, and the cooling-side coupling members 150 are respectively coupled to the jet-side coupling members 140, and are each provided with the cooling-side branch path which branches from the ink flow path 20, and which is communicated with the cooling flow path 42. The cooling-side coupling member 150 has the coupling surface 155 along the one surface of the jet-side coupling member 140, and along the direction perpendicular to the cooling pipe 41.

According to this configuration, due to the dual-partitioning coupling structure provided with the jet-side coupling member 140 and the cooling-side coupling member 150, it is possible for the coupling members 140, 150 to divide the load caused by the dimensional errors of the openings of the jet flow path 32 and the openings of the cooling flow path 42. In addition, by the coupling surface 155 of the cooling-side coupling member 150 extending along the one surface of the jet-side coupling member 140, and at the same time, extending along the direction perpendicular to the cooling pipe 41, it is possible to absorb the component along the coupling surface 155 in the respective dimensional errors when coupling the cooling-side coupling member 150 to the jet-side coupling member 140. Therefore, there is no chance to impose an excessive load to the coupling members 140, 150, and it is possible to prevent the deformation of the coupling members 140, 150. Therefore, it is possible to prevent the leakage from occurring.

In the inkjet head 5 according to the present embodiment, the cooling-side coupling member 150 has the housing recess 110 for housing the end portion of the cooling pipe 41. Between the bottom surface 111 of the housing recess 110 and the end portion of the cooling pipe 41, there is disposed the gap 112.

According to this configuration, when housing the end portion of the cooling pipe 41 in the housing recess 110, it is possible to absorb the misalignment of the end portion of the cooling pipe 41 (a component along the axial direction of the cooling pipe 41 out of the dimensional errors) with the gap 112.

The inkjet head 5 according to the present embodiment is provided with the elastic member 130 formed to have a ring-like shape along the outer circumference of the cooling pipe 41. The housing recess 110 is formed to have a cylindrical shape extending along the end portion side of the cooling pipe 41. The housing recess 110 increases in diameter toward a direction of getting away from the bottom surface 111 of the housing recess 110 in the axial direction of the housing recess 110. The outer diameter of the elastic member 130 which has not elastically deformed is smaller than the maximum diameter D2 of the housing recess 110, and at the same time, larger than the minimum diameter D1 of the housing recess 110.

According to this configuration, when housing the end portion side of the cooling pipe 41 in the housing recess 110 via the elastic member 130, the elastic member 130 is elastically deformed so as to gradually be squeezed as the elastic member 130 enters the housing recess 110 toward the bottom surface 111. In the state in which the elastic member 130 enters the housing recess 110 toward the bottom surface 111, the elastic member 130 is squeezed, and thus, the cooling pipe 41 is elastically supported. Therefore, it is possible to absorb the respective dimensional errors with the elastic member 130. In addition, since the housing recess 110 increases in diameter toward the direction of getting away from the bottom surface 111 in the axial direction, the elastic member 130 is gradually aligned (positioned inward in the radial direction) as the elastic member 130 enters the housing recess 110 toward the bottom surface 111. Therefore, due to the shape (a taper shape) increased in diameter of the housing recess 110, it is possible to achieve the positioning in the radial direction of the cooling pipe 41.

The inkjet head 5 according to the present embodiment is provided with the cooling member 50 which has higher thermal conductivity than the thermal conductivity of the cooling pipe 41, and in which at least a part of the cooling pipe 41 is insert-molded.

For example, when at least a part of the cooling pipe 41 is insert-molded in the cooling member 50, it becomes difficult to perform the positioning of the opening end part of the cooling pipe 41. In such a configuration, when coupling the respective openings with the single coupling member, there increases the possibility that an excessive load is imposed to the coupling member due to the respective dimensional errors. Then, the possibility of incurring occurrence of the leakage also increases.

In contrast, according to the present configuration, even when at least a part of the cooling pipe 41 is insert-molded in the cooling member 50, the respective dimensional errors can be absorbed when coupling the cooling-side coupling member 150 to the jet-side coupling member 140 as described above, and therefore, there is no chance that an excessive load is imposed to the respective coupling members 140, 150. Therefore, there is obtained a great advantage in preventing the leakage from occurring.

The inkjet head 5 according to the present embodiment is provided with the spacer 120 formed to have a cylindrical shape along the outer circumference of the cooling pipe 41. At least a part of the spacer 120 is disposed between the cooling member 50 and the cooling-side coupling member 150.

According to this configuration, since the certain gap is created between the cooling member 50 and the cooling-side coupling member 150 due to the spacer 120, it is possible to absorb the dimensional errors of the cooling member 50 and the cooling-side coupling member 150.

In the inkjet head 5 according to the present embodiment, the cooling-side coupling member 150 is fixed to the fastening target member 160 to which the cooling-side coupling member 150 is fastened, with the bolts 158 via the seating part 156 provided with the through-holes 157 for the bolts 158. The inner diameter J1 of the through-hole 157 is larger than the maximum diameter J2 of the external thread part of the bolt 158.

According to this configuration, it becomes possible to move the seating part 156 provided with the through-holes 157 in a direction crossing the axial direction of the external thread part with respect to the external thread part of the bolt 158. Therefore, when fixing the cooling-side coupling member 150 to the fastening target member 160 with the bolts 158, it is possible to absorb the component crossing the axial direction of the external thread part out of the respective dimensional errors.

The printer 1 according to the present embodiment is provided with the inkjet heads 5 described above, and the carriage 29 to which the inkjet heads 5 are attached.

According to this configuration, it is possible to obtain the printer 1 capable of preventing the leakage from occurring.

A method of manufacturing the inkjet head 5 according to the present embodiment is a method of manufacturing an inkjet head for jetting the ink. The inkjet heads 5 are each provided with the head main body 30, the cooling pipe 41, the jet-side coupling members 140, and the cooling-side coupling members 150, wherein the head main body 30 has the jet flow path 32 through which the ink passes, the cooling pipe 41 has the cooling flow path 42 through which the ink passes as the cooling medium for cooling the drive circuits 35, the jet-side coupling members 140 are coupled to the head main body 30, the jet-side branch path branches from the ink flow path 20 into which the ink inflows from the outside of the inkjet head 5, or from which the ink outflows to the outside of the inkjet head 5, the jet-side branch path is communicated with the jet flow path 32, the jet-side branch path is provided to each of the jet-side coupling members 140, and the cooling-side coupling members 150 are respectively coupled to the jet-side coupling members 140, and are each provided with the cooling-side branch path which branches from the ink flow path 20, and which is communicated with the cooling flow path 42. The cooling-side coupling member 150 has the coupling surface 155 along the one surface of the jet-side coupling member 140, and along the direction perpendicular to the cooling pipe 41. In the step of coupling the cooling-side coupling member 150, the cooling-side coupling member 150 is coupled to the jet-side coupling member 140 in the state in which the jet-side coupling member 140 is coupled to the head main body 30.

According to this method, due to the dual-partitioning coupling structure provided with the jet-side coupling member 140 and the cooling-side coupling member 150, it is possible for the coupling members 140, 150 to divide the load caused by the dimensional errors of the openings of the jet flow path 32 and the openings of the cooling flow path 42. In addition, by the coupling surface 155 of the cooling-side coupling member 150 extending along the one surface of the jet-side coupling member 140, and at the same time, extending along the direction perpendicular to the cooling pipe 41, it is possible to absorb the component along the coupling surface 155 in the respective dimensional errors when coupling the cooling-side coupling member 150 to the jet-side coupling member 140. Therefore, there is no chance to impose an excessive load to the coupling members 140, 150, and it is possible to prevent the deformation of the coupling members 140, 150. Therefore, it is possible to prevent the leakage from occurring.

Although the preferred embodiment of the present disclosure is hereinabove described, it should be understood that this is an illustrative description of the present disclosure, and should not be considered as a limitation. Modification such as addition, omission, and displacement can be implemented within the scope or the spirit of the present disclosure. Therefore, the present disclosure should not be assumed to be limited by the above description, but is limited by the appended claims.

Modified Examples

For example, in the embodiment described above, there is illustrated the configuration in which the cooling-side coupling member has the coupling surface along the one surface of the jet-side coupling member, and along the direction perpendicular to the cooling pipe, but this configuration is not a limitation. For example, the coupling surface of the cooling-side coupling member can extend along a direction obliquely crossing the cooling pipe. For example, it is possible to change the aspect of the coupling surface of the cooling-side coupling member in accordance with the design specification.

For example, in the embodiment described above, there is illustrated the configuration in which the cooling-side coupling member is provided with the cooling-side branch path branching from the ink flow path in which the ink inflows from the outside of the inkjet head, and from which the ink outflows, to be communicated with the cooling flow path, and the upside path branching from the ink flow path and communicated with the downside path, but this configuration is not a limitation. For example, the cooling-side coupling member is not required to be provided with the upside path (the jet-side branch path) communicated with the downside path (the jet-side branch path provided to the jet-side coupling member). For example, it is sufficient for the jet-side coupling member to be provided with the jet-side branch path branching from the liquid flow path to be communicated with the jet flow path, and it is sufficient for the cooling-side coupling member to be provided with the cooling-side branch path branching from the liquid flow path to be communicated with the cooling flow path. For example, it is possible to change the forming aspect of the jet-side branch path and the cooling-side branch path in accordance with the design specification.

For example, in the embodiment described above, there is illustrated the configuration in which the cooling-side coupling member has the housing recess for housing the end portion of the cooling pipe, and the gap is disposed between the bottom surface of the housing recess and the end portion of the cooling pipe, but this configuration is not a limitation. For example, the gap is not required to be disposed between the bottom surface of the housing recess and the end portion of the cooling pipe. For example, it is possible for the bottom surface of the housing recess and the end portion of the cooling pipe to have contact with each other. For example, it is possible to change the arrangement aspect of the bottom surface of the housing recess and the end portion of the cooling pipe in accordance with the design specification.

For example, in the embodiment described above, there is illustrated the configuration in which the elastic member formed to have the ring-like shape along the outer circumference of the cooling pipe is further provided, the housing recess is formed to have the cylindrical shape extending along the end portion side of the cooling pipe, the housing recess increases in diameter toward the direction of getting away from the bottom surface of the housing recess in the axial direction of the housing recess, the outer diameter of the elastic member having not elastically deformed is smaller than the maximum diameter of the housing recess, and at the same time, larger than the minimum diameter of the housing recess, but this configuration is not a limitation. For example, the housing recess is not required to increase in diameter toward the direction of getting away from the bottom surface of the housing recess in the axial direction of the housing recess. For example, the housing recess can have the inner diameter uniform in size throughout the whole length in the axial direction of the housing recess from the bottom surface of the housing recess. For example, it is possible to change the aspect of the housing recess in accordance with the design specification.

For example, in the embodiment described above, there is illustrated the configuration further provided with the cooling member which has higher thermal conductivity than that of the cooling pipe, and in which at least a part of the cooling pipe is insert-molded, but this configuration is not a limitation. For example, the cooling member can be integrated with the cooling pipe with a fixation member such as a bolt. For example, it is not required for at least a part of the cooling pipe to be insert-molded in the cooling member. For example, it is possible to change the aspect of integrating the cooling pipe and the cooling member with each other in accordance with the design specification.

For example, in the embodiment described above, there is illustrated the configuration in which the spacer formed to have the cylindrical shape along the outer circumference of the cooling pipe is further provided, and at least a part of the spacer is disposed between the cooling member and the cooling-side coupling member, but this configuration is not a limitation. For example, it is not required to dispose the spacer between the cooling member and the cooling-side coupling member. For example, it is possible for the cooling member and the cooling-side coupling member to have contact with each other. For example, it is possible to change the installation aspect of the spacer (the arrangement aspect of the cooling member and the cooling-side coupling member) in accordance with the design specification.

For example, in the embodiment described above, there is illustrated the configuration in which the cooling-side coupling member is fixed to the fastening target member to which the cooling-side coupling member is fastened, with the bolts via the seating part provided with the through-holes for the bolts, and the inner diameter of the through-hole is larger than the maximum diameter of the external thread part of the bolt, but this configuration is not a limitation. For example, the cooling-side coupling member can be fixed to the fastening target member with bolts without the intervention of the seating part provided with the through-holes for the bolts. For example, it is possible for the cooling-side coupling member to directly be fixed to the fastening target member. For example, it is possible to change the fixation aspect of the cooling-side coupling member in accordance with the design specification.

For example, in the embodiment described above, there is illustrated the configuration provided with the throttle members for controlling the flow path resistance of the cooling flow path, but this configuration is not a limitation. For example, the inkjet head can be provided with a throttle member for controlling the flow path resistance of the jet flow path. For example, it is sufficient for the inkjet head to be provided with a throttle member for controlling the flow path resistance of at least one of the jet flow path and the cooling flow path. For example, it is possible to change the installation aspect of the throttle members in accordance with the design specification.

For example, in the embodiment described above, there is illustrated the configuration in which the throttle members are each provided with the cylindrical part extending along the cooling flow path, and the flared part flared from the cylindrical part to the outer side of the end portions of the cooling pipe, but this configuration is not a limitation. For example, it is possible for the throttle member to be formed to have a cylindrical shape extending along the cooling flow path. For example, the throttle member is not required to be provided with the flared part. For example, it is possible to perform the attachment and the detachment of the throttle member by supporting the end portion of the throttle member. For example, it is possible to change the configuration aspect of the throttle members in accordance with the design specification.

For example, in the embodiment described above, there is illustrated the configuration in which the flared part is provided with the elastically deforming parts which extend from the flared part along the outer circumferential surface of the cooling pipe, and which is elastically deformable, but this configuration is not a limitation. For example, it is possible for the flared part to be formed to have a ring-like shape along the outer circumference of the cooling pipe. For example, the flared part is not required to be provided with the elastically deforming parts. For example, it is possible to change the configuration aspect of the flared part in accordance with the design specification.

For example, in the embodiment described above, there is illustrated the configuration in which the throttle member has the ring-like groove in which the end portion of the cooling pipe is inserted, and the radial grooves radially extending from the ring-like groove so as to zone the elastically deforming parts in a circumferential direction of the cylindrical part, but this configuration is not a limitation. For example, it is possible for the throttle member to have a groove extending in a single direction from the ring-like groove, or grooves extending in a plurality of directions from the ring-like groove. For example, it is possible to change the aspect of the grooves provided to the throttle member in accordance with the design specification.

For example, in the embodiment described above, there is illustrated the configuration in which the throttle member has the throttle entrance in which the ink inflows and the throttle exit from which the ink outflows, and the aperture area of the throttle exit is the same as the aperture area of the throttle entrance, but this configuration is not a limitation. For example, in the throttle member, the aperture area of the throttle exit can be smaller than the aperture area of the throttle entrance. For example, it is possible for the flow path area of the throttle member to gradually decrease toward a direction from the throttle entrance toward the throttle exit. For example, it is possible for the cylindrical part to have a cylindrical shape like an inverse tapered shape gradually decreasing in inner diameter toward the direction from the throttle entrance toward the throttle exit (toward the −X direction). According to this configuration, since the aperture area of the throttle exit is smaller than the aperture area of the throttle entrance, the flow rate of the ink becomes higher in the throttle exit than in the throttle entrance, and therefore, it is possible to prevent bubbles from being retained in the flow path. For example, it is possible to change the aspect of the flow path area of the throttle member in accordance with the design specification.

For example, in the embodiment described above, there is illustrated the configuration in which there is further provided the cooling member having the heat source arrangement surfaces on which the drive circuits are arranged, and having at least a part of the cooling pipe embedded therein, and the throttle member is disposed in other portion than the portion overlapping the heat source arrangement surfaces in the cooling pipe, but this configuration is not a limitation. For example, it is possible for the throttle member to be disposed in the portion overlapping the heat source arrangement surfaces in the cooling pipe. For example, it is possible to change the installation aspect of the throttle members in accordance with the design specification.

For example, in the embodiment described above, there is illustrated the configuration in which the flared part of the throttle member is housed in the housing recess, but this configuration is not a limitation.

Figure 13:
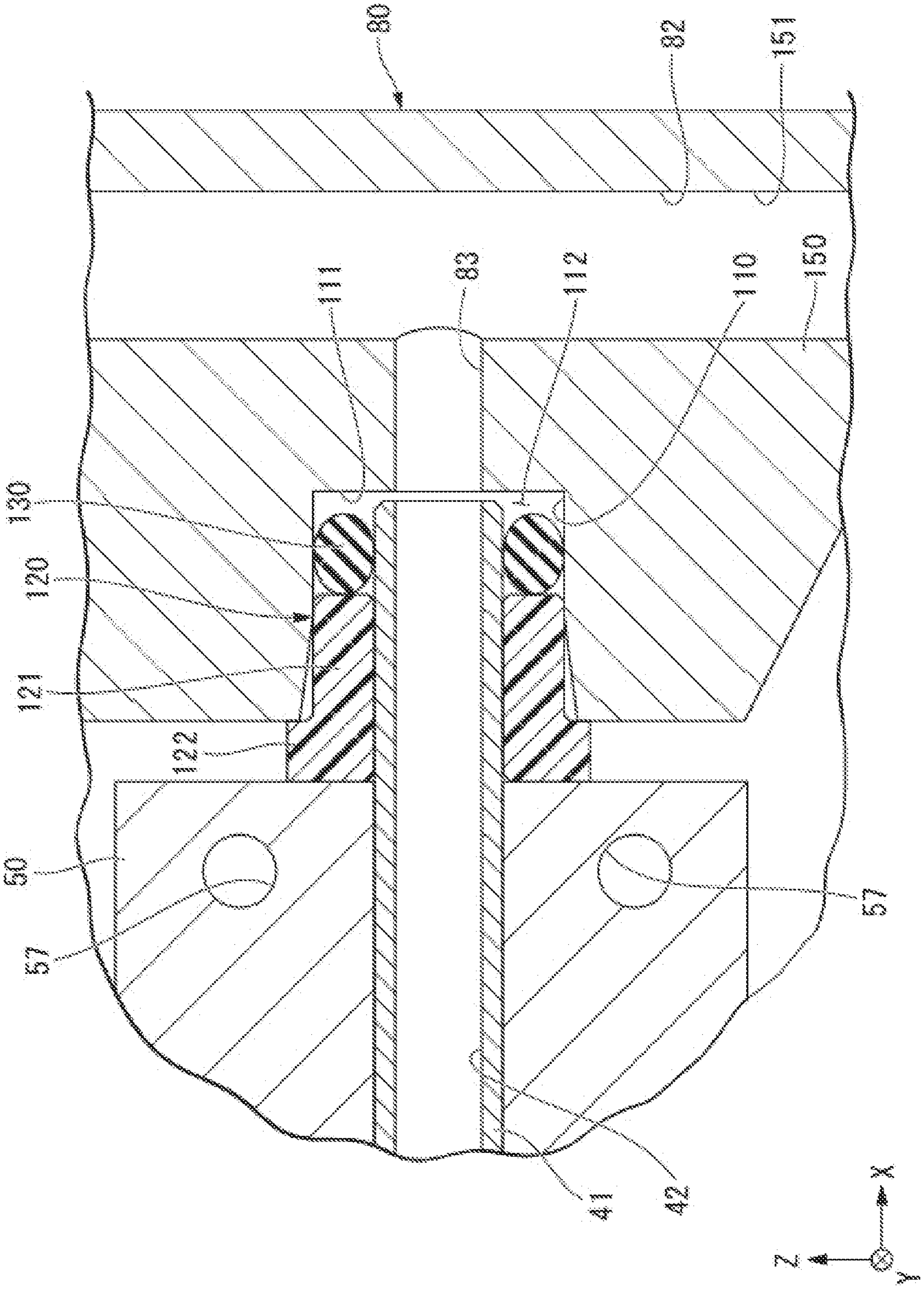
FIG. 13 is a cross-sectional view for explaining a modified example of the coupling structure of the cooling-side coupling member related to the embodiment.

FIG. 13 is a cross-sectional view for explaining a modified example of the coupling structure of the cooling-side coupling member related to the embodiment. In FIG. 13, the same constituents as those of the embodiment described above are denoted by the same reference symbols, and the detailed description thereof will be omitted.

For example, as shown in FIG. 13, the housing recess 110 is not required to house the flared part 102 of the throttle member 100. For example, it is possible for the housing recess 110 to house the elastic member 130 together with the end portion of the cooling pipe 41 so as to be adjacent to the bottom surface 111. For example, the inkjet head is not required to be provided with the throttle members. For example, it is possible to change the installation aspect of the throttle members in accordance with the design specification.

For example, in the embodiment described above, there is illustrated the configuration in which the recessed parts open toward the four directions crossing the central axis of the cooling pipe, but this configuration is not a limitation. For example, the recessed parts can open toward three or less, or five or more directions crossing the central axis of the cooling pipe. For example, it is possible to change the directions in which the recessed parts open in accordance with the design specification.

For example, in the embodiment described above, there is illustrated the configuration in which the cooling member has the heat source arrangement surfaces on which the drive circuits are arranged, and the heat source arrangement surfaces are disposed in the portion other than the recessed parts in the cooling member, but this configuration is not a limitation. For example, the heat source arrangement surfaces can be disposed in the recessed parts of the cooling member. For example, it is possible to change the installation aspect of the heat source arrangement surfaces in accordance with the design specification.

For example, in the embodiment described above, there is illustrated the configuration in which the heat source arrangement surfaces are each a plane, but this configuration is not a limitation. For example, the heat source arrangement surfaces can each include a curved surface. For example, the heat source arrangement surfaces can each have a shape along one of the surfaces of the drive circuit. For example, it is possible to change the configuration aspect of the heat source arrangement surfaces in accordance with the design specification.

For example, in the embodiment described above, there is illustrated the configuration in which the cooling member has the first surface and the second surface arranged at respective sides opposite to each other across the cooling pipe, and the heat source arrangement surfaces are disposed on each of the first surface and the second surface, but this configuration is not a limitation. For example, the heat source arrangement surfaces can be disposed on either one of the first surface and the second surface (a single side). For example, it is possible to change the installation aspect of the heat source arrangement surfaces in accordance with the design specification.

For example, in the embodiment described above, there is illustrated the configuration in which the end portions of the cooling pipe are arranged outside the outer shape of the cooling member, but this configuration is not a limitation. For example, the end portions of the cooling pipe can be arranged inside or coplanar with the outer shape of the cooling member. For example, it is possible to change the arrangement aspect of the end portions of the cooling pipe in accordance with the design specification.

For example, in the embodiment described above, there is illustrated the configuration in which the cooling pipe has the straight-pipe shape, but this configuration is not a limitation. For example, the cooling pipe can have a curved shape. For example, the cooling pipe can include a straight part and a curved part. For example, it is possible to change the shape of the cooling pipe in accordance with the design specification.

For example, in the embodiment described above, there is illustrated the configuration in which the cooling pipe is formed of stainless steel, and the cooling member is formed of aluminum simple body or aluminum alloy, but this configuration is not a limitation. For example, the cooling pipe can be formed of copper alloy, titanium alloy, nickel alloy, chromium alloy, or the like, and the cooling member can be formed of zinc alloy or the like. For example, it is possible to change the constituent materials of the cooling pipe and the cooling member in accordance with the design specification.

For example, in the embodiment described above, there is illustrated the configuration in which the cooling member has the recessed parts in at least a part of the portion surrounding the cooling pipe, but this configuration is not a limitation. For example, the cooling member is not required to have the recessed parts. For example, it is sufficient to embed at least a part of the cooling pipe in the cooling member using the insert molding or the like. For example, it is possible to change the installation aspect of the recessed parts in accordance with the design specification.

Further, for example, in the embodiment described above, the description is presented citing the inkjet printer as an example of the liquid jet recording device, but the liquid jet recording device is not limited to the printer. For example, a facsimile machine, an on-demand printing machine, and so on can also be adopted.

In the embodiment described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiment described above, there is described the case when the recording target medium P is paper, but this configuration is not a limitation. The recording target medium P is not limited to paper, but can also be a metal material or a resin material, and can also be food or the like.

In the embodiment described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiment described above, there is described the configuration in which the Z direction coincides with the gravitational direction, but this configuration is not a limitation, and it is also possible to set the Z direction to a direction along the horizontal direction.

What is claimed is:

1. A liquid jet head configured to jet ink comprising:

a head main body having inkjet head and a jet flow path formed through the head main body, wherein the jet flow path is configured for the ink to pass therethrough to jet the ink out of the inkjet head;

an ink circulation flow path configured to circulate the ink through the jet flow path of the inkjet head;

an electric circuit operable to drive the ink out of the inkjet head;

a cooling pipe having a cooling flow path through which the ink passes, wherein the cooling pipe is thermally connected to the electric circuit to cool the electric circuit with the ink passing through the cooling flow path;

a pair of first and second cooling-side coupling members, wherein the first cooling- side coupling member is formed to have first and second inflow branch paths running through the first cooling-side coupling member, and the second cooling-side coupling member is formed to have first and second outflow branch paths running through the second cooling-side coupling member, wherein the first inflow branch path is configure to guide part of the ink, circulating through the ink circulation flow path, into the jet flow path, and the second inflow branch path is configured to guide a rest of the ink, circulating through the ink circulation flow path, into the cooling flow path of the cooling pipe, and wherein the first outflow branch flow path is configured to return the ink from the jet flow path into the ink circulation flow path, and the second outflow branch flow path is configured to return the ink from the cooling flow path into the ink circulation flow path; and a pair of first and second jet-side coupling members configured to join the head main body, respectively, with the pair of first and second cooling side coupling members, the pair of first and second jet-side coupling members being formed, respectively, with inflow and outflow jet-side branch paths to establish communication of the jet flow path with the first inflow branch path and the first outflow branch path for the ink to flow through the first inflow branch, the inflow jet-side branch path, the jet flow path, the outflow jet-side branch path and the first outflow branch path, wherein the pair of first and second cooling-side coupling members each have a first coupling surface having a first opening therein that communicates with one of the inflow or outflow branch path, and the pair of jet-side coupling members each have a second coupling surface having a second opening therein that communicates with one of the inflow or outflow jet-side branch path, wherein the first and second coupling surfaces connect directly to each other, in alignment of the first opening with the second opening, and along a plane transversing a length direction of the cooling pipe.

2. The liquid jet head according to claim 1, wherein the pair of cooling-side coupling members each have a housing recess configured to house an end portion of the cooling pipe, and each of the housing recesses is configured to have a bottom surface facing an end of the cooling pipe with a gap between the bottom surface and the end of the cooling pipe.

3. The liquid jet head according to claim 2, further comprising an elastic member formed to have a ring-like shape circumferentially surrounding each of the end portions of the cooling pipe, wherein each of the housing recesses is formed to have a generally cylindrical space extending from the bottom surface in the length direction of the cooling pipe to surround the end portion of the cooling pipe, the generally cylindrical space being formed to have diameters that increase from a minimum diameter to a maximum diameter as getting away from the bottom surface, and the elastic member, when it is free from any external forces, is formed to have an outer diameter smaller than the maximum diameter of the housing recess and larger than the minimum diameter of the housing recess.

4. The liquid jet head according to claim 1, further comprising a cooling member which is higher in thermal conductivity than the cooling pipe, wherein the cooling pipe is insert-molded at least in part in the cooling member.

5. The liquid jet head according to claim 4, further comprising a spacer formed to have a cylindrical shape circumferentially surrounding the cooling pipe, wherein at least a part of the spacer is disposed between the cooling member and the cooling-side coupling member.

6. The liquid jet head according to claim 1, wherein the cooling-side coupling member is fixed by a bolt to a fastening target member to with a seating part provided between the cooling-side coupling member and the fastening target member, wherein with the seating part is formed with a through-hole for the bolt to go through, and an inner diameter of the through-hole is larger than a maximum diameter of an external thread part of the bolt.

7. A liquid jet recording device comprising:

the liquid jet head according to claim 1; and a carriage to which the liquid jet head is attached.

* * * * *